(12) United States Patent
Eistein et al.

(10) Patent No.: US 11,700,081 B1
(45) Date of Patent: Jul. 11, 2023

(54) CHANNEL AWARE SET PARTITIONING FOR MULTI-LEVEL CODING

(71) Applicant: QUALCOMM Incorporated, San Diego, CA (US)

(72) Inventors: Yaniv Eistein, Tel Aviv (IL); Ronen Shaked, Kfar Saba (IL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/590,607

(22) Filed: Feb. 1, 2022

(51) Int. Cl.
*H04L 1/00* (2006.01)
*H04L 5/00* (2006.01)
*H04L 1/24* (2006.01)

(52) U.S. Cl.
CPC .......... *H04L 1/0009* (2013.01); *H04L 1/0014* (2013.01); *H04L 1/246* (2013.01); *H04L 5/0044* (2013.01)

(58) Field of Classification Search
CPC .................................................... H04L 1/0014
See application file for complete search history.

(56) References Cited

U.S. PATENT DOCUMENTS

| | | | | |
|---|---|---|---|---|
| 7,205,912 B1* | 4/2007 | Yang | ................ | G11B 20/10055 714/755 |
| 7,720,136 B2* | 5/2010 | Friedman | ............... | H04L 1/0017 375/220 |
| 7,821,938 B2* | 10/2010 | Friedman | ............... | H04L 1/0034 370/395.42 |
| 7,839,952 B2* | 11/2010 | Sofer | .................... | H04W 28/22 375/267 |
| 2008/0115036 A1* | 5/2008 | Kuznetsov | ....... | G11B 20/10055 714/758 |
| 2009/0092208 A1* | 4/2009 | Montekyo | ............... | H04L 1/005 375/346 |

\* cited by examiner

*Primary Examiner* — Mujtaba M Chaudry
(74) *Attorney, Agent, or Firm* — Holland & Hart LLP

(57) ABSTRACT

Methods, systems, and devices for wireless communications are described. A first device may receive one or more signals from a second device. The first device may estimate one or more metrics associated with noise of the one or more signals. The first device may transmit, to the second device and based on the estimating, a report indicating the one or more metrics. The first device may receive a message indicating a multi-level coding scheme from the second device. The multi-level coding scheme may be based on the one or more metrics and may indicate a partitioning configuration of the multi-level coding scheme for communications between the first device and the second device. The first device may communicate with the second device using the partitioning configuration of the multi-level coding scheme.

30 Claims, 17 Drawing Sheets

CHANNEL AWARE SET PARTITIONING FOR MULTI-LEVEL CODING

FIELD OF TECHNOLOGY

The following relates to wireless communications, including channel aware set partitioning for multi-level coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities or one or more network access nodes, each simultaneously supporting communication for multiple communication devices, which may be otherwise known as user equipment (UE).

SUMMARY

The described techniques relate to improved methods, systems, devices, and apparatuses that support channel aware set partitioning for multi-level coding. Generally, a first device may receive one or more signals from a second device. The first device may estimate one or more metrics associated with noise of the one or more signals. The first device may transmit, to the second device and based on the estimating, a report indicating the one or more metrics. The first device may receive a message indicating a multi-level coding scheme from the second device. The multi-level coding scheme may be based on the one or more metrics and may indicate a partitioning configuration of the multi-level coding scheme for communications between the first device and the second device. The first device may communicate with the second device using the partitioning configuration of the multi-level coding scheme. Such techniques may increase the reliability of wireless communications between devices, among other benefits.

A method for wireless communication at a first device is described. The method may include receiving one or more signals from a second device, estimating one or more metrics associated with noise of the one or more signals, transmitting, to the second device and based on the estimating, a report indicating the one or more metrics, receiving, from the second device, a message indicating a multi-level coding scheme, the multi-level coding scheme based on the one or more metrics and indicating a partitioning configuration of the multi-level coding scheme for communications between the first device and the second device, and communicating with the second device using the partitioning configuration of the multi-level coding scheme.

An apparatus for wireless communication at a first device is described. The apparatus may include a processor, memory coupled with the processor, and one or more instructions stored in the memory. The one or more instructions may be executable by the processor to cause the apparatus to, based on the one or more instructions, receive one or more signals from a second device, estimate one or more metrics associated with noise of the one or more signals, transmit, to the second device and based on the estimating, a report indicating the one or more metrics, receive, from the second device, a message indicating a multi-level coding scheme, the multi-level coding scheme based on the one or more metrics and indicating a partitioning configuration of the multi-level coding scheme for communications between the first device and the second device, and communicate with the second device using the partitioning configuration of the multi-level coding scheme.

Another apparatus for wireless communication at a first device is described. The apparatus may include means for receiving one or more signals from a second device, means for estimating one or more metrics associated with noise of the one or more signals, means for transmitting, to the second device and based on the estimating, a report indicating the one or more metrics, means for receiving, from the second device, a message indicating a multi-level coding scheme, the multi-level coding scheme based on the one or more metrics and indicating a partitioning configuration of the multi-level coding scheme for communications between the first device and the second device, and means for communicating with the second device using the partitioning configuration of the multi-level coding scheme.

A non-transitory computer-readable medium storing code for wireless communication at a first device is described. The code may include instructions executable by a processor to receive one or more signals from a second device, estimate one or more metrics associated with noise of the one or more signals, transmit, to the second device and based on the estimating, a report indicating the one or more metrics, receive, from the second device, a message indicating a multi-level coding scheme, the multi-level coding scheme based on the one or more metrics and indicating a partitioning configuration of the multi-level coding scheme for communications between the first device and the second device, and communicate with the second device using the partitioning configuration of the multi-level coding scheme.

In some examples of the method, apparatuses, and non-transitory computer-readable medium described herein, communicating with the second device using the partitioning configuration may include operations, features, means, or instructions for mapping, based on the partitioning configuration, a number of bits of a signal onto a subset of constellation symbols of a set of constellation symbols, the subset of constellation symbols including a coset associated with a level of the multi-level coding scheme, each constellation symbol of the subset of constellation symbols separated according to a Euclidean distance and an angular distance, where the Euclidean distance and the angular distance may be based on the mapping of the number of bits and the partitioning configuration.

Some examples of the method, apparatuses, and non-transitory computer-readable medium described herein may further include operations, features, means, or instructions for estimating a thermal noise metric associated with the Euclidean distance and a phase noise metric associated with the angular distance, where the one or more metrics include the thermal noise metric and the phase noise metric and determining the Euclidean distance and the angular distance based on the thermal noise metric, the phase noise metric, or both.

Some examples of the method, apparatuses, and non-transitory computer-readable medium described herein may further include operations, features, means, or instructions for determining that the angular distance may be a first value based on the phase noise metric exceeding the thermal noise metric and that the Euclidean distance may be a second value less than the first value based at least on part on the phase noise metric exceeding the thermal noise metric.

Some examples of the method, apparatuses, and non-transitory computer-readable medium described herein may further include operations, features, means, or instructions for determining that the angular distance may be a first value based on the phase noise metric exceeding a summation of the thermal noise metric and a noise gap and that the Euclidean distance may be a second value less than the first value based at least on part on the phase noise metric exceeding the summation of the thermal noise metric and the noise gap.

Some examples of the method, apparatuses, and non-transitory computer-readable medium described herein may further include operations, features, means, or instructions for determining that the angular distance may be a first value based on the phase noise metric being below a phase noise threshold and that the Euclidean distance may be a second value less than the first value based at least on part on the phase noise metric being below the phase noise threshold.

Some examples of the method, apparatuses, and non-transitory computer-readable medium described herein may further include operations, features, means, or instructions for determining that the Euclidean distance may be a first value based on the thermal noise metric being below a thermal noise threshold and that the angular distance may be a second value less than the first value based at least on part on the thermal noise metric being below the thermal noise threshold.

In some examples of the method, apparatuses, and non-transitory computer-readable medium described herein, communicating with the second device using the partitioning configuration may include operations, features, means, or instructions for generating at least one signal based on the partitioning configuration of the multi-level coding scheme, the at least one signal including a single carrier signal or a single-carrier orthogonal frequency division multiplexing signal and transmitting the at least one signal to the second device.

In some examples of the method, apparatuses, and non-transitory computer-readable medium described herein, transmitting the report may include operations, features, means, or instructions for transmitting, to the second device and based on the estimating, a request for the multi-level coding scheme, the request including the report and a partitioning configuration preference, where receiving the message indicating the multi-level coding scheme may be based on the request.

In some examples of the method, apparatuses, and non-transitory computer-readable medium described herein, receiving, from the second device, the message indicating the multi-level coding scheme may include operations, features, means, or instructions for receiving, from the second device, an index corresponding to one or more parameters of the multi-level coding scheme, where the one or more parameters include the partitioning configuration, a number of bits to map to a first level of the multi-level coding scheme, a number of bits to map to a second level of the multi-level coding scheme, or a combination thereof.

In some examples of the method, apparatuses, and non-transitory computer-readable medium described herein, communicating with the second device using the partitioning configuration of the multi-level coding scheme may include operations, features, means, or instructions for communicating with the second device using the partitioning configuration, the partitioning configuration identified based on the index and a table associated with the index.

In some examples of the method, apparatuses, and non-transitory computer-readable medium described herein, the table may be preconfigured at the first device, the second device, or both.

In some examples of the method, apparatuses, and non-transitory computer-readable medium described herein, the partitioning configuration includes a group partitioning configuration associated with a group of devices and the group of devices includes the first device.

In some examples of the method, apparatuses, and non-transitory computer-readable medium described herein, the one or more metrics includes a phase noise metric associated with a frequency stability of the one or more signals, the frequency stability based on a transmitting component of the second device and a receiving component of the first device.

In some examples of the method, apparatuses, and non-transitory computer-readable medium described herein, the one or more metrics includes a thermal noise metric, the thermal noise metric including a signal-to-noise ratio (SNR).

In some examples of the method, apparatuses, and non-transitory computer-readable medium described herein, the multi-level coding scheme includes a quadrature amplitude modulation (QAM) multi-level coding scheme or an amplitude phase shift keying (APSK) multi-level coding scheme.

A method for wireless communication at a second device is described. The method may include transmitting one or more signals to at least a first device, receiving, from the first device and based on the one or more signals, a report indicating one or more metrics associated with noise of the one or more signals received at the first device, and transmitting, to the first device, a message indicating a multi-level coding scheme based on the one or more metrics, the multi-level coding scheme indicating a partitioning configuration for the multi-level coding scheme for communications between the first device and the second device.

An apparatus for wireless communication at a second device is described. The apparatus may include a processor, memory coupled with the processor, and one or more instructions stored in the memory. The one or more instructions may be executable by the processor to cause the apparatus to, based on the one or more instructions, transmit one or more signals to at least a first device, receive, from the first device and based on the one or more signals, a report indicating one or more metrics associated with noise of the one or more signals received at the first device, and transmit, to the first device, a message indicating a multi-level coding scheme based on the one or more metrics, the multi-level coding scheme indicating a partitioning configuration for the multi-level coding scheme for communications between the first device and the second device.

Another apparatus for wireless communication at a second device is described. The apparatus may include means for transmitting one or more signals to at least a first device, means for receiving, from the first device and based on the one or more signals, a report indicating one or more metrics associated with noise of the one or more signals received at the first device, and means for transmitting, to the first device, a message indicating a multi-level coding scheme based on the one or more metrics, the multi-level coding scheme indicating a partitioning configuration for the multi-level coding scheme for communications between the first device and the second device.

A non-transitory computer-readable medium storing code for wireless communication at a second device is described. The code may include instructions executable by a processor to transmit one or more signals to at least a first device, receive, from the first device and based on the one or more signals, a report indicating one or more metrics associated with noise of the one or more signals received at the first device, and transmit, to the first device, a message indicating a multi-level coding scheme based on the one or more metrics, the multi-level coding scheme indicating a partitioning configuration for the multi-level coding scheme for communications between the first device and the second device.

In some examples of the method, apparatuses, and non-transitory computer-readable medium described herein, the multi-level coding scheme indicates a mapping of a number of bits of a signal onto a subset of constellation symbols of a set of constellation symbols and a Euclidean distance and an angular distance for separating each constellation symbol of the subset of constellation symbols, the subset of constellation symbols including a coset associated with a level of the multi-level coding scheme and the Euclidean distance and the angular distance based on the mapping of the number of bits and the partitioning configuration.

Some examples of the method, apparatuses, and non-transitory computer-readable medium described herein may further include operations, features, means, or instructions for determining that the angular distance may be a first value based on a phase noise metric exceeding a thermal noise metric and that the Euclidean distance may be a second value less than the first value based at least on part on the phase noise metric exceeding the thermal noise metric, the one or more metrics including the phase noise metric and the thermal noise metric.

Some examples of the method, apparatuses, and non-transitory computer-readable medium described herein may further include operations, features, means, or instructions for determining that the angular distance may be a first value based on a phase noise metric exceeding a summation of a thermal noise metric and a noise gap and that the Euclidean distance may be a second value less than the first value based at least on part on the phase noise metric exceeding the summation of the thermal noise metric and the noise gap, the one or more metrics including the phase noise metric and the thermal noise metric.

Some examples of the method, apparatuses, and non-transitory computer-readable medium described herein may further include operations, features, means, or instructions for determining that the angular distance may be a first value based on a phase noise metric being below a phase noise threshold and that the Euclidean distance may be a second value less than the first value based at least on part on the phase noise metric being below the phase noise threshold, the one or more metrics including the phase noise metric.

Some examples of the method, apparatuses, and non-transitory computer-readable medium described herein may further include operations, features, means, or instructions for determining that the Euclidean distance may be a first value based on a thermal noise metric being below a thermal noise threshold and that the angular distance may be a second value less than the first value based at least on part on the thermal noise metric being below the thermal noise threshold, the one or more metrics including the thermal noise metric.

In some examples of the method, apparatuses, and non-transitory computer-readable medium described herein, receiving the report indicating the one or more metrics may include operations, features, means, or instructions for receiving, from the first device and based on the one or more signals, a request for the multi-level coding scheme, the request including the report and a partitioning configuration preference, where transmitting the message indicating the multi-level coding scheme may be based on the request.

In some examples of the method, apparatuses, and non-transitory computer-readable medium described herein, transmitting, to the first device, the message indicating the multi-level coding scheme may include operations, features, means, or instructions for transmitting, to the first device, an index corresponding to one or more parameters of the multi-level coding scheme, where the one or more parameters include the partitioning configuration, a number of bits to map to a first level of the multi-level coding scheme, a number of bits to map to a second level of the multi-level coding scheme, or a combination thereof.

Some examples of the method, apparatuses, and non-transitory computer-readable medium described herein may further include operations, features, means, or instructions for transmitting one or more signals to a third device and receiving, from the third device and based on the one or more signals transmitted to the third device, a second report indicating one or more metrics associated with noise of the one or more signals transmitted to the third device, where transmitting, to the first device, the message indicating the multi-level coding scheme may be based on the report from the first device and the second report from the third device.

In some examples of the method, apparatuses, and non-transitory computer-readable medium described herein, the partitioning configuration includes a group partitioning configuration associated with a group of devices and the group of devices includes the first device and the third device.

In some examples of the method, apparatuses, and non-transitory computer-readable medium described herein, the one or more metrics includes a phase noise metric associated with a frequency stability of the one or more signals, the frequency stability based on a transmitting component of the second device and a receiving component of the first device.

In some examples of the method, apparatuses, and non-transitory computer-readable medium described herein, the one or more metrics includes a thermal noise metric, the thermal noise metric including an SNR.

In some examples of the method, apparatuses, and non-transitory computer-readable medium described herein, the multi-level coding scheme includes a QAM multi-level coding scheme or an APSK multi-level coding scheme.

DETAILED DESCRIPTION

Figure 1:
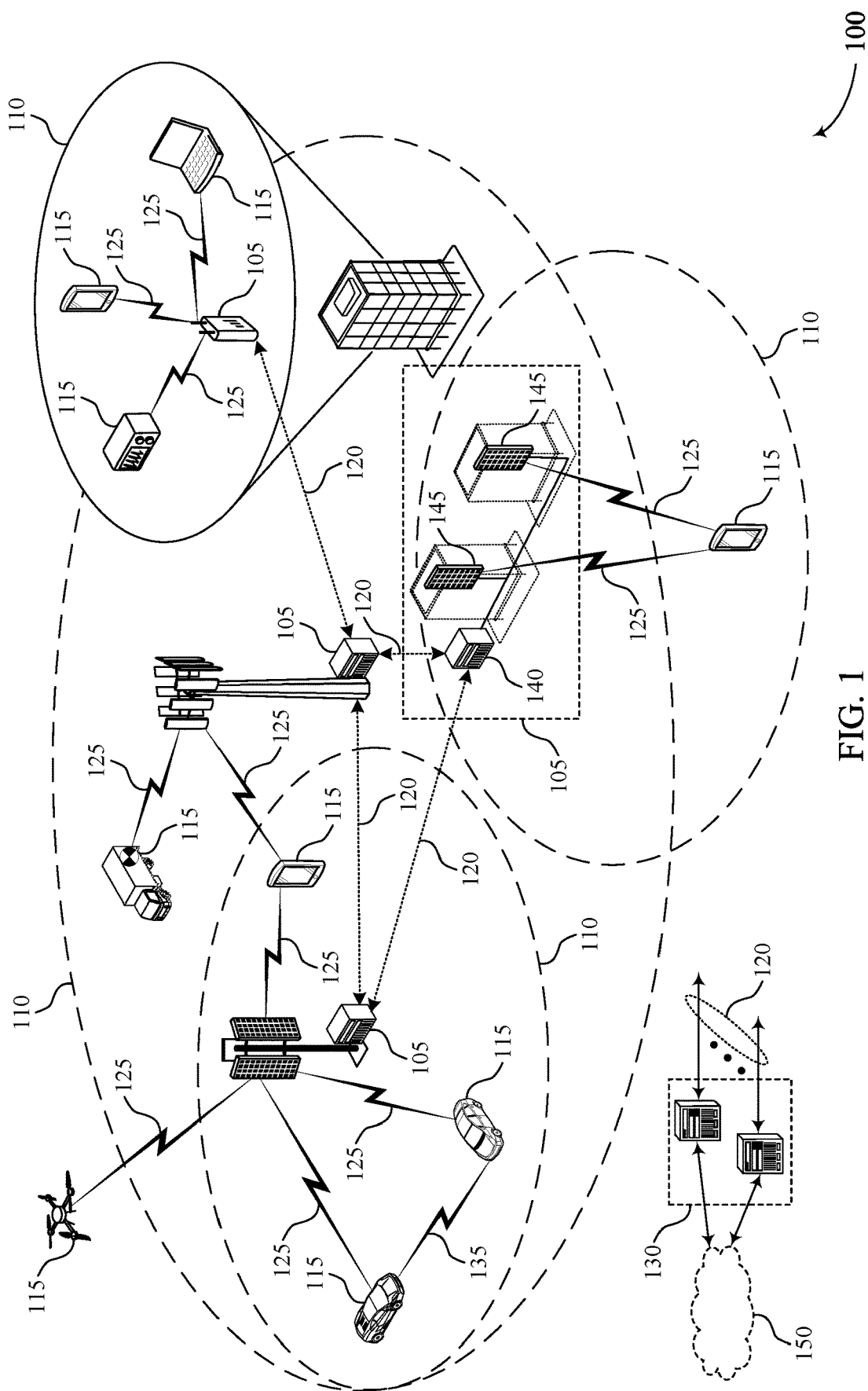
FIGS. 1 through 3 each illustrate an example of a wireless communications system that supports channel aware set partitioning for multi-level coding in accordance with aspects of the present disclosure.

Some wireless communications systems may include communication devices, such as user equipments (UEs) and network entities, that may support multiple radio access technologies (RATs). In some wireless communications systems, these communication devices may communicate via communication links, which may be subject to channel impairments. Some communication devices may employ encoding of source information (e.g., data packets, information bits) to improve the reliability with which another communication device may recover (e.g., receive, decode, obtain) the original source information. For example, a communications device may support multi-level coding schemes in which a communication device may use set partitioning to map bits of a signal onto constellation symbols. For some set partitioning techniques, the constellation symbols may be partitioned such that the Euclidean distance between neighboring (e.g., adjacent) constellation symbols (e.g., a minimum distance between constellation symbols of a coset) may be increased (e.g., to a maximum distance or an otherwise suitable distance), for example to reduce thermal noise (e.g., Gaussian noise, additive white noise) sensitivity of the encoded bits. Increasing the Euclidean distance between neighboring constellation symbols, however, may result in a decrease in the angular distance between neighboring constellation symbols and, accordingly, an increase in phase noise sensitivity of the encoded bits. Therefore, such set partitioning techniques may be unable to accommodate changes in channel conditions, such as some types of channel impairments (e.g., phase noise) becoming dominant (e.g., having an increased influence over channel conditions or causing relatively greater distortions) relative to thermal noise.

Various aspects of the present disclosure generally relate to techniques for channel aware set partitioning for multi-level coding, and more specifically, to techniques for adapting a partitioning configuration (e.g., a set partitioning configuration) based on channel conditions. For example, a communication device (e.g., a UE) may adapt partitioning configurations based on a given channel impairment (e.g., a dominant channel impairment). The UE may determine (e.g., measure, estimate) a phase noise metric, a thermal noise metric, or other metrics to determine whether phase noise or thermal noise may be the dominant channel impairment. In some examples, if the thermal noise metric exceeds the phase noise metric (e.g., or satisfies a thermal noise threshold), the UE may determine that thermal noise is the dominant channel impairment. As such, the UE may determine to use a partitioning configuration that increases the Euclidean distance (e.g., to a maximum distance or an otherwise suitable distance) between neighboring constellation symbols. If the phase noise metric exceeds the thermal noise metric (e.g., or satisfies a phase noise threshold), the UE may determine that phase noise is the dominant channel impairment. As such, the UE may determine to use a partitioning configuration that increases the angular distance (e.g., to a maximum distance or an otherwise suitable distance) between the neighboring constellation symbols.

The UE may indicate the determined partitioning configuration to another communication device (e.g., a network entity), for example in a request for a multi-level coding scheme. In response, the network entity may indicate, to the UE, a multi-level coding scheme to be used by the UE. The multi-level coding scheme may include a number of bits to be mapped to each level of the multi-level coding scheme and a partitioning configuration to be used by the UE. Additionally or alternatively, the UE may indicate the phase noise metric and the thermal noise metric to the network entity. The network entity may use the indicated metrics to determine the partitioning configuration to be used by the UE. In some examples, to reduce processing power, the network entity may determine a partitioning configuration for multiple UEs. For example, the network entity may use phase noise metrics and thermal noise metrics measured at each UE of the multiple UEs to determine a partitioning configuration (e.g., a group partitioning configuration) that may be suitable for a relatively large number (e.g., a majority or an otherwise acceptable number) of the multiple UEs.

Particular aspects of the subject matter described herein may be implemented to realize one or more of the following potential advantages. The techniques employed by the described communication devices may provide benefits and enhancements to the operation of the communication devices, including enabling adaptive set partitioning based on channel conditions. For example, operations performed by the described communication devices may provide enhancements to procedures for multi-level coding by using a partitioning configuration based on a dominant channel impairment. In some examples, the operations performed by the described communication devices may support improvements to reliability of communications from channel aware set partitioning, improved spectral efficiency, and increased data rates, among other benefits.

Aspects of the disclosure are initially described in the context of wireless communications systems. Aspects of the disclosure are also described in the context of multi-level coding schemes and a process flow. Aspects of the disclosure are further illustrated by and described with reference to a process flow, apparatus diagrams, system diagrams, and flowcharts that relate to channel aware set partitioning for multi-level coding.

FIG. 1 illustrates an example of a wireless communications system 100 that supports channel aware set partitioning for multi-level coding in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a geographic coverage area 110 over which the UEs 115 and the network entity 105 may establish one or more communication links 125. The geographic coverage area 110 may be an example of a geographic area over which a network entity 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, network entity 105, entity of a core network 130, apparatus, device, or computing system configured to perform any techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different. Similarly, reference to a UE 115, a network entity 105, an apparatus, a device, or a computing system may include disclosure of the UE 115, network entity 105, apparatus, device, or computing system being a network node. For example, disclosure that a UE 115 is configured to receive information from a network entity 105 also discloses that a first network node is configured to receive information from a second network node. In this example, consistent with this disclosure, the first network node may refer to a first UE 115, a first network entity 105, a first apparatus, a first device, or a first computing system configured to receive the information; and the second network node may refer to a second UE 115, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{mmax} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

In some examples of the wireless communications system 100, a first device (e.g., a UE 115 or a network entity 105) may receive one or more signals from a second device (e.g., another UE 115 or another network entity 105). The first device may estimate one or more metrics associated with noise (e.g., thermal noise metric, phase noise metric, or other metrics) of the one or more signals. The first device may transmit, to the second device and based on the estimating, a report indicating the one or more metrics. The first device may receive a message indicating a multi-level coding scheme from the second device. The multi-level coding scheme may be based on the one or more metrics and may indicate a partitioning configuration of the multi-level coding scheme for communications between the first device and the second device. The first device may communicate with the second device using the partitioning configuration of the multi-level coding scheme.

Figure 2:
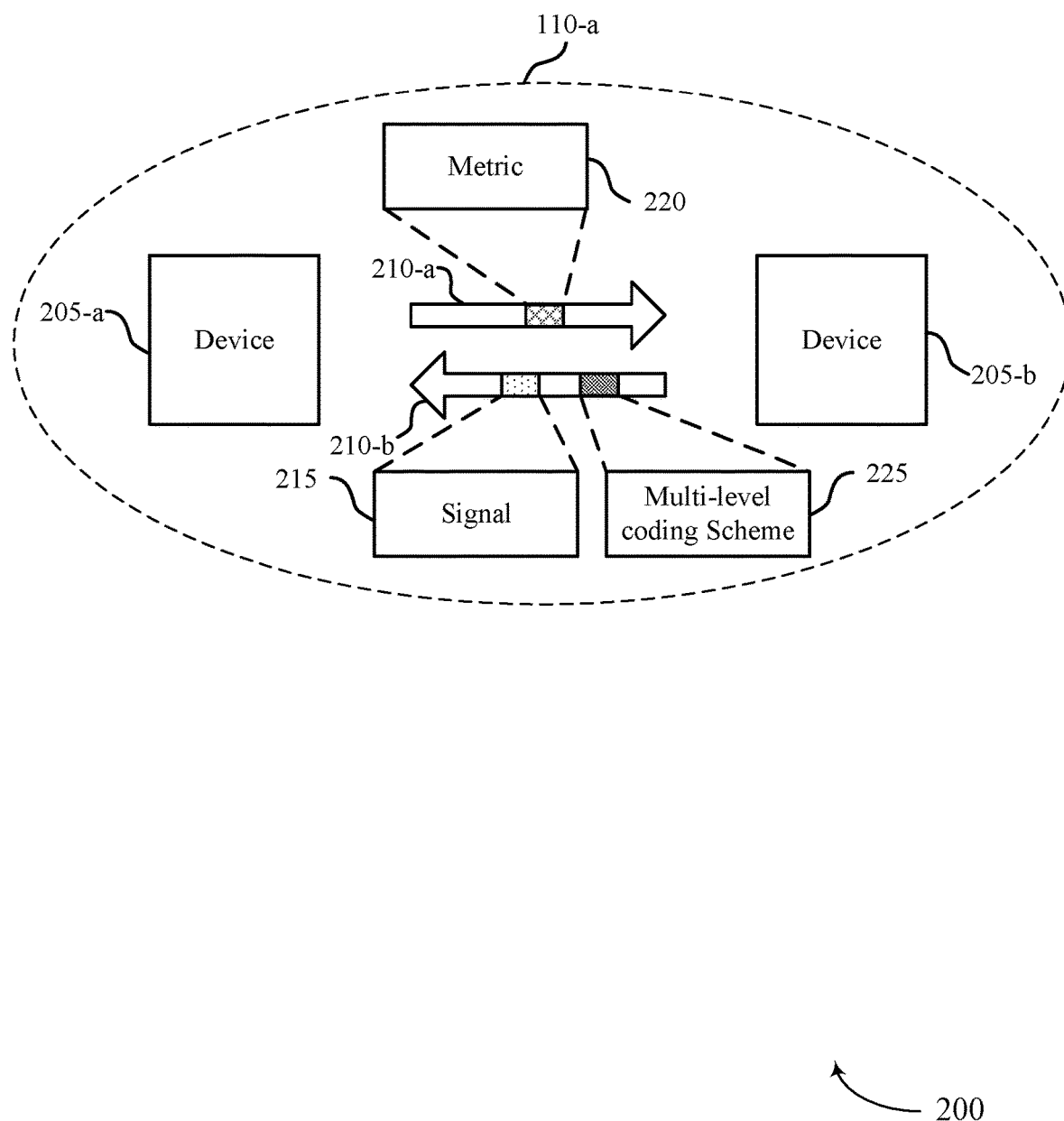

FIG. 2 illustrates an example of a wireless communications system 200 that supports channel aware set partitioning for multi-level coding in accordance with aspects of the present disclosure. In some examples, the wireless communications system 200 may implement aspects of the wireless communications system 100. For example, the wireless communications system 200 may include one or more devices 205 (e.g., a device 205-*a* and a device 205-*b*), which may be examples of a UE 115 or a network entity 105 as described with reference to FIG. 1. The device 205-*a* and the device 205-*b* may communicate within a geographic coverage area 110-*a*, which may be an example of a geographic coverage area 110 described with reference to FIG. 1. In some examples, the devices 205 may communicate via one or more communication links 210 (e.g., a communication link 210-*a* or a communication link 210-*b*). In the example of FIG. 2, the communication links 210 may be uplinks, downlinks, or sidelinks, among other examples.

In some examples of the wireless communications system 200, the devices 205 may support encoding schemes, such as multi-level coding, that account for capacity variation (e.g., per bit) of constellation symbols. For example, some multi-level coding techniques may use set partitioning to map bits of a signal onto constellation symbols. Set partitioning may include Euclidean separation of constellation symbols (e.g., separation of cosets) and bit allocation of both the cosets (e.g., inter-coset bit allocation) and the symbols internal to the cosets (e.g., intra-symbol bit allocation).

For example, some techniques (e.g., methods) of multi-level coding (e.g., the Ungerboek method) may include set partitioning of constellation symbols into cosets (e.g., subsets of constellation symbols), such that a Euclidean distance (e.g., between neighboring constellation symbols for each respective coset) may be increased (e.g., to a maximum distance or an otherwise acceptable distance), which may improve the thermal noise sensitivity (e.g., decrease the sensitivity to thermal noise). That is, for some set partitioning techniques, the Euclidean distance between neighboring symbols may be increased to reduce (e.g., consider) thermal noise or sensitivity to thermal noise. Such techniques, however, may be limited and inflexible, and may not consider phase noise or other channel impairments, which may be deficient in some scenarios, for example if thermal noise is not dominant (e.g., does not have an increased influence over channel conditions or does not cause relatively greater distortions) compared to other channel impairments, such as phase noise. The techniques herein, including techniques related to channel aware set partitioning (e.g., flexible set partitioning techniques which consider channel conditions), may increase the performance of multi-level coding by enabling the modification of set partitioning based on multiple channel impairments, such as thermal noise and phase noise, among other examples.

In some examples, the Euclidean separation (e.g., distance) of the constellation symbols may be adapted based on channel impairments (e.g., phase noise and thermal noise). For example, if the thermal noise is dominant (e.g., has an increased influence over channel conditions or causes relatively greater distortions) compared to other channel impairments, such as the phase noise, a set partitioning configuration (e.g., a partitioning configuration) that increases the Euclidean distance (e.g., to a maximum distance or an otherwise acceptable distance) between neighboring constellation symbols may be used. Additionally or alternatively, if the phase noise is dominant (e.g., has an increased influence over channel conditions or causes relatively greater distortions) compared to other channel impairments, such as the thermal noise, a partitioning configuration that increases the angular distance (e.g., to a maximum distance or an otherwise acceptable distance) between neighboring constellation symbols may be used. In some examples, a partitioning configuration chosen (e.g., selected, determined) by a communication device (e.g., one or more devices 205) may be indicated to another communication device (e.g., another device 205). That is, a given partitioning configuration may be selected and communicated (e.g., through signaling) between communication devices, for example based on the dominant channel impairment.

For example, the device 205-*a* (e.g., a UE 115 or a network entity 105) may receive one or more signals 215 from the device 205-*b* (e.g., another UE 115 or another network entity 105). The device 205-*a* may estimate one or more metrics 220 associated with noise of the one or more signals 215. For example, the device 205-*a* may determine an estimation (e.g., an estimated value) for each of the one or more metrics 220. In some examples, the device 205-*a* may determine an estimated value for each of the one or more metrics 220 based on measurements performed at the device 205-*a* (e.g., on the received one or more signals 215). For example, the device 205-*a* may perform one or more measurements to determine (e.g., obtain) a value for each of the one or more metrics 220. In some examples, the determined value for each of the one or more metrics 220 may be an approximate value calculated at the device 205-*a*. For example, the device 205-*a* may calculate the approximate value (e.g., estimation) of the one or more metrics 220 based on the one or more measurements performed at the device 205-*a* and or one or more other factors (e.g., parameters).

The device 205-*a* may transmit, to the device 205-*b* (e.g., via the communication link 210-*a*) a report indicating the one or more metrics 220. The device 205-*a* may receive a message indicating a multi-level coding scheme 225 (e.g., a quadrature amplitude modulation (QAM) multi-level coding scheme or an amplitude phase shift keying (APSK) multi-level coding scheme) from the device 205-*b* (e.g., via the communication link 210-*b*). The multi-level coding scheme 225 may be based on the one or more metrics 220 and may indicate a partitioning configuration of the multi-level coding scheme 225. The device 205-*a* may communicate with the device 205-*b* using the partitioning configuration of the multi-level coding scheme 225. As such, the device 205-*a* may improve procedures for multi-level coding.

Figure 3:
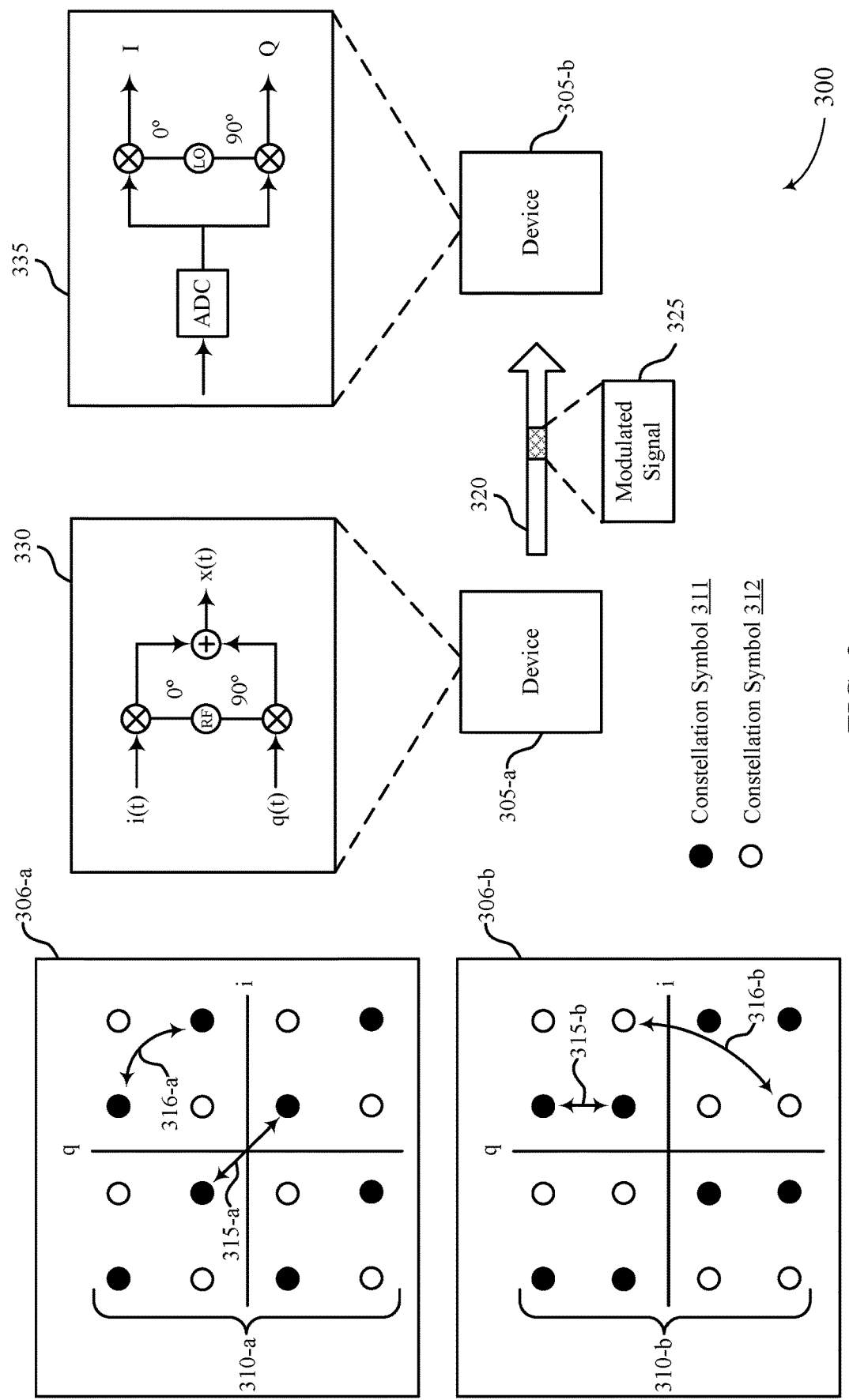

FIG. 3 illustrates an example of a wireless communications system 300 that supports channel aware set partitioning for multi-level coding in accordance with aspects of the present disclosure. In some examples, the wireless communications system 300 may implement aspects of the wireless communications system 100 and the wireless communications system 200. For example, the wireless communications system 300 may include one or more devices 305 (e.g., a device 305-*a* and a device 305-*b*), which may be examples of devices as described with reference to FIGS. 1 and 2. The device 305-*a* and the device 305-*b* may communicate via a communication link 320. In the example of FIG. 3, the communication link 320 may be an uplink, a downlink, or a sidelink, among other examples.

In some examples of the wireless communications system 300, a communication device (e.g., the device 305-*a*) may employ multi-level coding schemes to improve the reliability with which another communication device (e.g., the device 305-*b*) may recover the original source information. For example, as illustrated in the example of FIG. 3, the device 305-*a* may generate a modulated signal (x(t)) using a modulator 330. In some examples, the device 305-*a* may generate the modulated signal by combining one or more in-phase signals (i(t)) and one or more quadrature signals (q(t)), which may be referred to as modulating signals (e.g., baseband signals). The quadrature signals may be shifted (e.g., phase shifted) from the in-phase signals (e.g., by about 90 degrees).

In some examples, using the modulator 330, carrier signals may be generated (e.g., via a radio frequency oscillator (RF)), modulated by the one or more in-phase signals (i(t)) and the one or more quadrature signals (q(t)), and combined to generate a modulated signal (x(t)) to be transmitted to the device 305-b. For example, the device 305-a may generate (e.g., via the modulator 330) and transmit a modulated signal 325 to the device 305-b (e.g., via the communication link 320). In some examples, the carrier signals (e.g., waveforms) may be single carrier signals (e.g., true single carrier signals based on pulse shaping) or single carrier OFDM signals. The device 305-b may use a demodulator 335 to extract the in-phase components (I) and the quadrature components (Q) of the modulated signal 325. For example, using the demodulator 335, the modulated signal 325 may be passed through an analog-to-digital converter (ADC), multiplied by a digital local oscillator (LO), and passed through a lowpass filter (not shown) to generate the in-phase components (I) and the quadrature components (Q). The LO may apply a phase shift (e.g., of about 90 degrees) to the quadrature components (Q).

In some examples, a modulated signal (e.g., the modulated signal 325) may be illustrated using one or more constellation diagrams 306 (e.g., a constellation diagram 306-a or a constellation diagram 306-b). For example, the information (e.g., bits) transmitted via a modulated signal may be represented by symbols (e.g., phase and amplitude combinations encoded over a time duration of the modulated signal) and each symbol may be represented as a point (e.g., constellation symbol) on a constellation diagram. That is each constellation symbol illustrated by the constellation diagrams 306 may correspond to a symbol (e.g., vector) of a modulated signal with a particular in-phase component (i) and a particular quadrature component (q).

In some examples, a set of constellation symbols (e.g., representing a modulated signal) may be divided (e.g., partitioned) into cosets according to multiple (e.g., different) configurations. For example, the device 305-a may use set partitioning (e.g., as part of a multi-level coding scheme) to separate (e.g., partition) a set of constellation symbols into cosets and map (e.g., allocate) bits of a signal (e.g., the modulated signal 325) onto the constellation symbols. In some examples, the set of constellation symbols representing the modulated signal 325 may be partitioned into cosets (e.g., the first coset including constellation symbols 311 and the second coset including constellation symbols 312) according to one or more partitioning configurations 310 (e.g., a partitioning configuration 310-a and a partitioning configuration 310-b). In some examples, the number of bits represented by (e.g., mapped to) each constellation symbol 311 may be different from (e.g., or the same as) the number of bits mapped to each constellation symbol 312.

In some examples, cosets of a partitioning configuration may be associated with a level (e.g., or different levels) of the multi-level coding scheme. For example, some bits of a signal (e.g., bits with a relatively strong coding rate compared to other bits of the signal or bits with a coding rate above a threshold coding rate) may be mapped to the mother constellation (e.g., a first level of a multi-level coding scheme), while other bits of the signal (e.g., bits with a relatively weak coding rate compared to other bits of a signal or bits with a coding rate below a threshold coding rate) may be mapped to a coset (e.g., subset) of constellation symbols. As such, the bits mapped to the mother constellation may experience protection (e.g., from decoding errors) due to a relatively high coding rate and the bits mapped to the coset may experience protection (e.g., from decoding errors) due to a separation of the constellation symbols within the coset. That is, by using set partitioning, the device 305-a may improve the reliability with which the device 305-b may recover encoded information (e.g., data, bits, information bits).

In some examples, the device 305-a may using one or more partitioning configurations 310 (e.g., a partitioning configuration 310-a or a partitioning configuration 310-b) to improve the reliability with which the device 305-b may recover information encoded in the modulated signal 325. For example, as part of a multi-level coding scheme (e.g., a 16 QAM multi-level coding scheme) the device 305-a may map a number of bits (e.g., 1) to each constellation symbol at a relatively higher level (e.g., a second level) and a number of bits (e.g., 3) to each constellation symbol at a relatively lower level (e.g., a first level). Such partitioning may yield two cosets (e.g., the coset including the constellation symbols 311 and the coset including the constellation symbols 312), in which each coset may include 8 constellation symbols. In some examples, a partitioning configuration may correspond to a particular division (e.g., partitioning) of the constellation symbols into the two cosets. It is to be understood that the partitioning configurations described herein may change based on implementation of one or more devices (e.g., the device 305-a, the device 305-b, or both), and the examples described herein should not be considered limiting to the scope covered by the claims or the disclosure.

In some examples, the device 305-a may consider multiple partitioning configurations (e.g., multiple configurations for dividing the constellation symbols into cosets) and may determine to perform set partitioning according to the partitioning configuration 310-a. For example, the device 305-a may perform set partitioning, such that a Euclidean distance 315-a between neighboring constellation symbols 311 may be increased (e.g., to a maximum distance or an otherwise acceptable distance). In such an example, the bits mapped to the constellation symbols 311 may experience an increased protection from decoding errors due to thermal noise. That is, by using a partitioning configuration in which the Euclidean distance 315-a between neighboring constellation symbols is increased (e.g., to a maximum distance or an otherwise acceptable distance), the device 305-a may promote a reduced sensitivity to thermal noise. However, as illustrated in the example of FIG. 3, increasing the Euclidean distance between neighboring constellation symbols (e.g., of a same coset), may result in an angular distance 316-a between the neighboring constellation symbols being reduced (e.g., lowered), thus increasing the sensitivity to phase noise.

In some examples, to improve (e.g., reduce) phase noise sensitivity, the device 305-a may modify (e.g., change) the Euclidean distance (e.g., separation, division), such that the angular distance between neighboring constellation symbols may be increased. For example, the device 305-a may perform set partitioning according to the partitioning configuration 310-b, such that an angular distance 316-b between neighboring constellation symbols 311 may be increased (e.g., to a maximum distance or an otherwise acceptable distance). As such, the phase noise may be reduced, for example at the cost of a reduced Euclidean distance (e.g., a Euclidean distance 315-b) and an increased sensitivity to thermal noise. Therefore, the device 305-a may adapt partitioning configurations used for communications with the device 305-b based on a dominant channel impairment (e.g., thermal noise or phase noise).

Figure 4A:
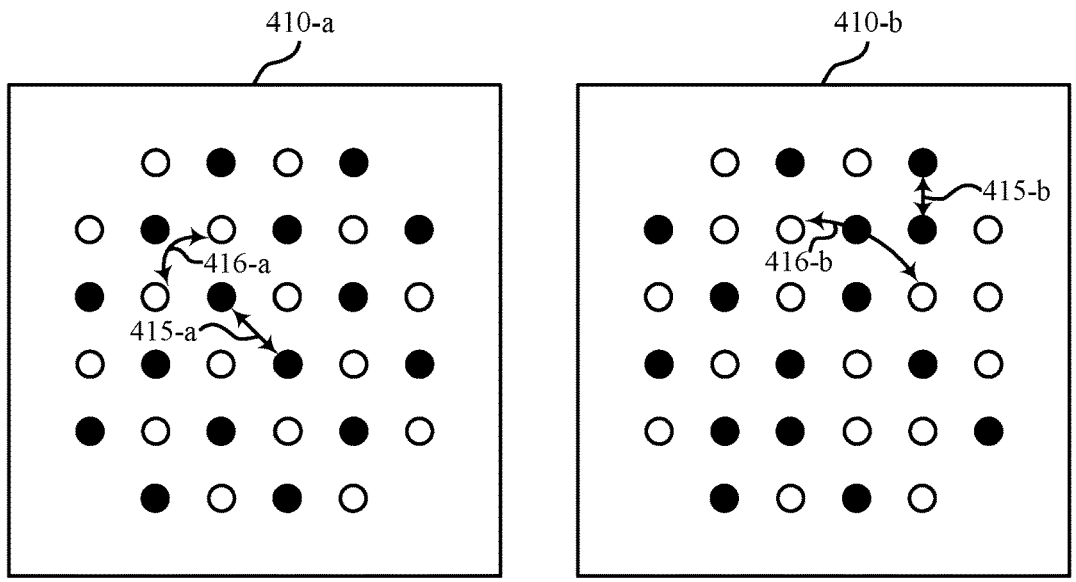
FIGS. 4A and 4B each illustrate an example of a multi-level coding scheme that supports channel aware set partitioning for multi-level coding in accordance with aspects of the present disclosure.
Figure 4B:
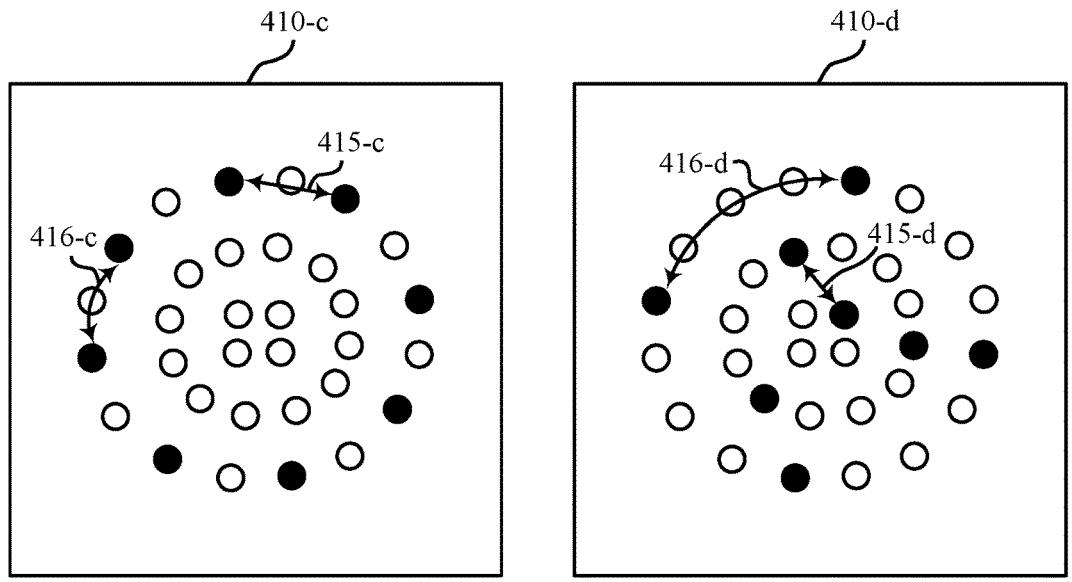

FIGS. 4A and 4B each illustrate an example of a multi-level coding scheme 400 (e.g., a multi-level coding scheme 400-a and a multi-level coding scheme 400-b, respectively)

that supports channel aware set partitioning for multi-level coding in accordance with aspects of the present disclosure. In some examples, the multi-level coding schemes 400 may implement aspects of the wireless communications system 100, the wireless communications system 200, and the wireless communications system 300. For example, the multi-level coding schemes 400 may be implemented by one or more devices as described with reference to FIGS. 1 through 3.

In some examples, a device (e.g., a UE 115 or a network entity 105) may adapt a partitioning configuration used as part of the multi-level coding schemes 400 based on channel conditions. For example, the device may measure (e.g., estimate) an observed phase noise metric and an observed thermal noise metric of signals received from another device (e.g., another UE 115 or another network entity 105) and adapt a partitioning configuration to use for communications with the other device based on the observed thermal noise metric and the observed phase noise metric.

As illustrated in the example of FIG. 4A, the device may map, as part of the multi-level coding scheme 400-*a* (e.g., a 32 QAM multi-level coding scheme), a number of bits (e.g., 1) to each constellation symbol at a relatively higher level (e.g., a second level) and a number of bits (e.g., 4) to each constellation symbol at a relatively lower level (e.g., a first level). Such partitioning may yield two cosets (e.g., a coset including the constellation symbols 411-*a* and a coset including the constellation symbols 412-*a*), in which each coset may include 16 constellation symbols. Additionally or alternatively, as illustrated in the example of FIG. 4B, the device may map, as part of the multi-level coding scheme 400-*b* (e.g., a 32 APSK multi-level coding scheme), a number of bits (e.g., 2) to each constellation symbol at a relatively higher level (e.g., a second level) and a number of bits (e.g., 3) to each constellation symbol at a relatively lower level (e.g., a first level). Such partitioning may yield four cosets, in which each coset may include 8 constellation symbols. For example, such partitioning may yield a coset including the constellation symbols 411-*b* and three other cosets (not shown) including the constellation symbols 412-*b*. It is to be understood that the partitioning configurations and the multi-level coding schemes described herein may change based on implementation of one or more devices (e.g., the first device, the second device, or both), and the examples described herein should not be considered limiting to the scope covered by the claims or the disclosure.

In some examples, the device may determine to use the partitioning configuration 410-*a* or the partitioning configuration 410-*c*, such that a Euclidean distance 415 (e.g., a Euclidean distance 415-*a* or a Euclidean distance 415-*c*) between neighboring constellation symbols 411 (e.g., coset points) may be increased (e.g., to a maximum distance or an otherwise acceptable distance), thereby promoting a reduced sensitivity to thermal noise. However, in such an example, an angular distance 416 (e.g., an angular distance 416-*a* or an angular distance 416-*c*) may be reduced and, accordingly, the phase noise sensitivity may be increased.

However, in some examples (e.g., for communications with an increasing link budget and relatively high SNR), the phase noise may have a relatively greater impact (e.g., may be a dominant channel impairment) on communications between the device and one or more other device compared to other channel impairments, such as thermal noise. Therefore, to improve phase noise sensitivity, the device may modify the partitioning configuration (e.g., the Euclidean division), such that the angular distance 416 may be increased and the sensitivity to phase noise may be reduced.

For example, the device may determine to perform set partitioning according to the partitioning configuration 410-*b* or the partitioning configuration 410-*d*, in which an angular distance 416 (e.g., an angular distance 416-*b* or an angular distance 416-*d*) may be increased (e.g., to a maximum distance or an otherwise acceptable distance). In some examples, increasing the angular distance 416 may result in a reduction of a Euclidean distance 415 (e.g., a Euclidean distance 415-*b* or a Euclidean distance 415-*d*) and an increased sensitivity to thermal noise.

In some examples, the device may determine to use a partitioning configuration based on channel conditions (e.g., the observed phase noise metric and the observed thermal noise metric). For example, the device may determine to use a partitioning configuration in which the Euclidean distance 415 is increased relative to the angular distance 416 (e.g., the device may use the partitioning configuration 410-*a* or the partitioning configuration 410-*c*) based on the thermal noise metric satisfying a threshold (e.g., being greater, equal to, or less than a thermal noise threshold), exceeding the phase noise metric (e.g., or failing to exceed the phase noise metric), exceeding a summation of the phase noise metric and a noise gap (e.g., or failing to exceed the summation of the phase noise metric and the noise gap), or any combination thereof. In some examples, the noise gap may correspond to a gap between the phase noise metric and the thermal noise metric.

Additionally or alternatively, the device may determine to use a partitioning configuration in which the angular distance 416 is increased relative to the Euclidean distance 415 (e.g., the partitioning configuration 410-*b* or the partitioning configuration 410-*d*) based on the phase noise metric satisfying a threshold (e.g., being greater, equal to, or less than a phase noise threshold), exceeding the thermal noise metric (e.g., or failing to exceed the thermal noise metric), exceeding a summation of the thermal noise metric and a noise gap (e.g., or failing to exceed the summation of the thermal noise metric and the noise gap), or any combination thereof. That is, the device may adapt partitioning configurations used for communications with other devices based on a dominant channel impairment (e.g., thermal noise or phase noise) or one or more other conditions.

Figure 5:
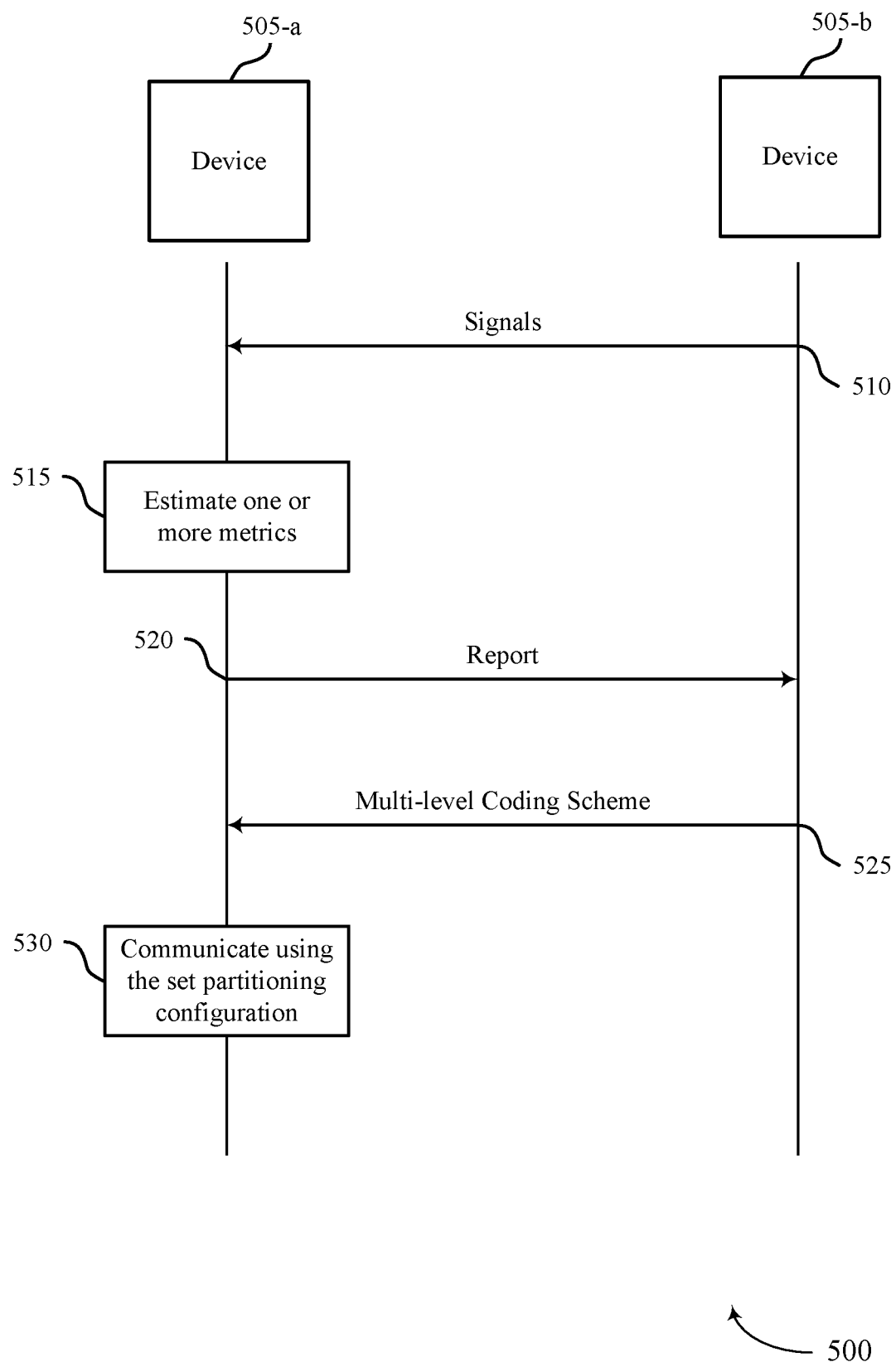
FIG. 5 illustrates an example of a process flow that supports channel aware set partitioning for multi-level coding in accordance with aspects of the present disclosure.

FIG. 5 illustrates an example of a process flow 500 that supports channel aware set partitioning for multi-level coding in accordance with aspects of the present disclosure. The process flow 500 may implement or be implemented by one or more aspects of the wireless communications system 100, the wireless communications system 200, and the wireless communications system 300. For example, the process flow 500 may include one or more devices 505 (e.g., a device 505-*a* and a device 505-*b*), which may be examples of devices as described with reference to FIGS. 1 through 3. The process flow 500 may be implemented by the device 505-*a*, the device 505-*b*, or both. In the following description of the process flow 500, operations between the device 505-*a* and the device 505-*b* may occur in a different order or at different times than as shown. Some operations may also be omitted from the process flow 500, and other operations may be added to the process flow 500.

At 510, the device 505-*a* (e.g., a UE 115 or a network entity 105) may receive one or more signals from the device 505-*b* (e.g., another UE 115 or another network entity 105). At 515, the device 505-*a* may estimate one or more metrics (e.g., of decibel (dB) units) associated with the noise of the one or more signals transmitted at 510. For example, the device 505-*a* may estimate a phase noise metric and a thermal noise metric of the one or more signals transmitted from the device 505-b. In some examples, the phase noise metric (e.g., an air phase noise metric) may correspond to a frequency stability of the signals transmitted between the device 505-a and the device 505-b. For example, the frequency stability may be based on (e.g., be equal to a summation of) a frequency stability of a transmitting component of the device 505-b and a receiving component of the device 505-a.

At 520, the device 505-a may transmit, to the device 505-b, a report indicating the one or more metrics. In some examples, the device 505-a may select (e.g., determine) a partitioning configuration (e.g., a mapping of a multi-level coding scheme) based on the one or more metrics. That is, the device 505-a may determine a preferred partitioning configuration based on the one or more metrics. The device 505-a may indicate (e.g., signal) the selected (e.g., preferred) partitioning configuration to the device 505-b, for example as a request (e.g., included in the report transmitted at 520). In some examples (e.g., if the phase noise is the dominant channel impairment compared to other channel impairments), the device 505-a may indicate a partitioning configuration in which the angular distance between neighboring constellation symbols is increased (e.g., the sensitivity to phase noise is reduced). In other examples (e.g., if the thermal noise is the dominant channel impairment compared to other channel impairments), the device 505-a may indicate a partitioning configuration in which the Euclidean distance between neighboring constellation symbols is increased and the sensitivity to thermal noise is reduced.

In response, the device 505-b may indicate (e.g., signal), to the device 505-a, a multi-level coding partitioning configuration to be used by the device 505-a. For example, at 525, the device 505-b may transmit a message (e.g., via RRC, medium access control control element (MAC-CE), or downlink control information (DCI)) indicating a multi-level coding scheme to the device 505-a. In some examples, the message may include an index (e.g., or multiple indices) corresponding to one or multiple parameters of the multi-level coding scheme. For example, the index may correspond to the partitioning configuration, a number of bits to map to a first level of the multi-level coding scheme, a number of bits to map to a second level of the multi-level coding scheme, or any combination thereof. In some examples, the index may correspond to entries (e.g., parameters associated with multiple multi-level coding schemes) listed in a table. The table may be indicated communicated between the devices 505 or, in some examples, may be defined or configured at the devices 505. That is, the device 505-a may identify one or more parameters associated with the multi-level coding scheme by comparing the index to a table.

In some examples, the multi-level coding scheme may be based on the one or more metrics and may indicate a partitioning configuration of the multi-level coding scheme to be used for communications between the device 505-a and the device 505-b. For example, considering the phase noise metric (e.g., the phase noise power) and the thermal noise metric (e.g., the thermal noise level, a signal-to-noise ratio (SNR)), the device 505-b may determine the partitioning configuration (e.g., the mapping of a multi-level coding scheme) to be used by the device 505-a. At 530, the device 505-a may communicate using the indicated set partitioning configuration. That is, the devices 505 may support methods of multi-level coding that consider both the thermal noise and phase-noise.

In some examples, the device 505-b may determine the partitioning configuration based on requests from multiple other devices 505 (not shown). For example, the device 505-b may receive requests for multi-level coding schemes from multiple devices 505 and each request may include phase noise metrics and thermal noise metrics measured at the respective devices 505. The device 505-b may use the indicated metrics to determine a partitioning configuration (e.g., a group partitioning configuration) that may be suitable for a relatively large number (e.g., a majority or an otherwise acceptable number) of the multiple devices 505.

Figure 6:
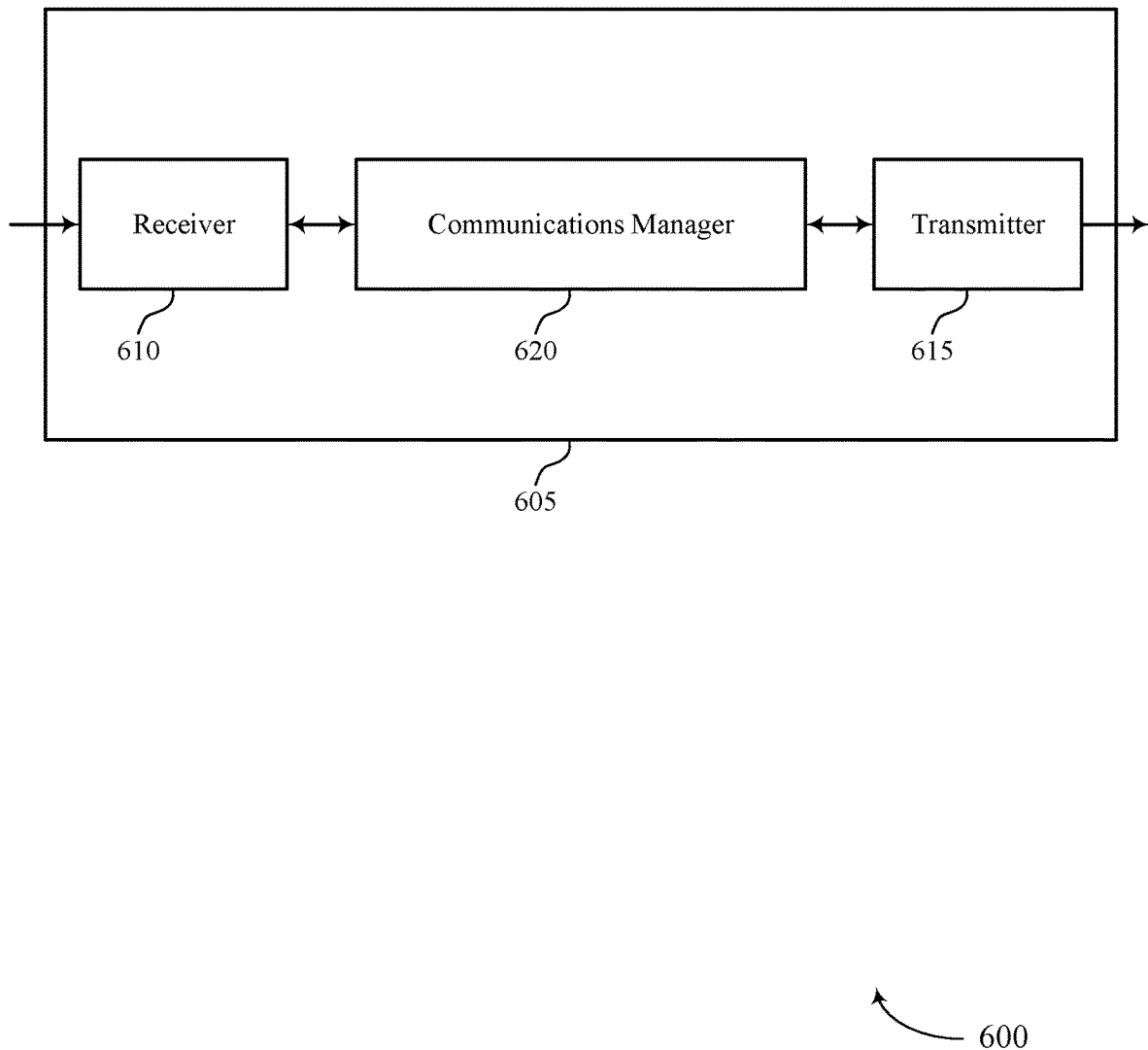
FIGS. 6 and 7 show block diagrams of devices that support channel aware set partitioning for multi-level coding in accordance with aspects of the present disclosure.

FIG. 6 shows a block diagram 600 of a device 605 that supports channel aware set partitioning for multi-level coding in accordance with aspects of the present disclosure. The device 605 may be an example of aspects of a UE 115 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel aware set partitioning for multi-level coding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel aware set partitioning for multi-level coding). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel aware set partitioning for multi-level coding as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device (e.g., the device 605) in accordance with examples as disclosed herein. For example, the communications manager 620 may be configured as or otherwise support a means for receiving one or more signals from a second device (e.g., another device 605). The communications manager 620 may be configured as or otherwise support a means for estimating one or more metrics associated with noise of the one or more signals. The communications manager 620 may be configured as or otherwise support a means for transmitting, to the second device and based on the estimating, a report indicating the one or more metrics. The communications manager 620 may be configured as or otherwise support a means for receiving, from the second device, a message indicating a multi-level coding scheme, the multi-level coding scheme based on the one or more metrics and indicating a partitioning configuration of the multi-level coding scheme for communications between the first device and the second device. The communications manager 620 may be configured as or otherwise support a means for communicating with the second device using the partitioning configuration of the multi-level coding scheme.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption, more efficient utilization of communication resources, improved spectral efficiency, and improved utilization of processing capability, among other benefits.

Figure 7:
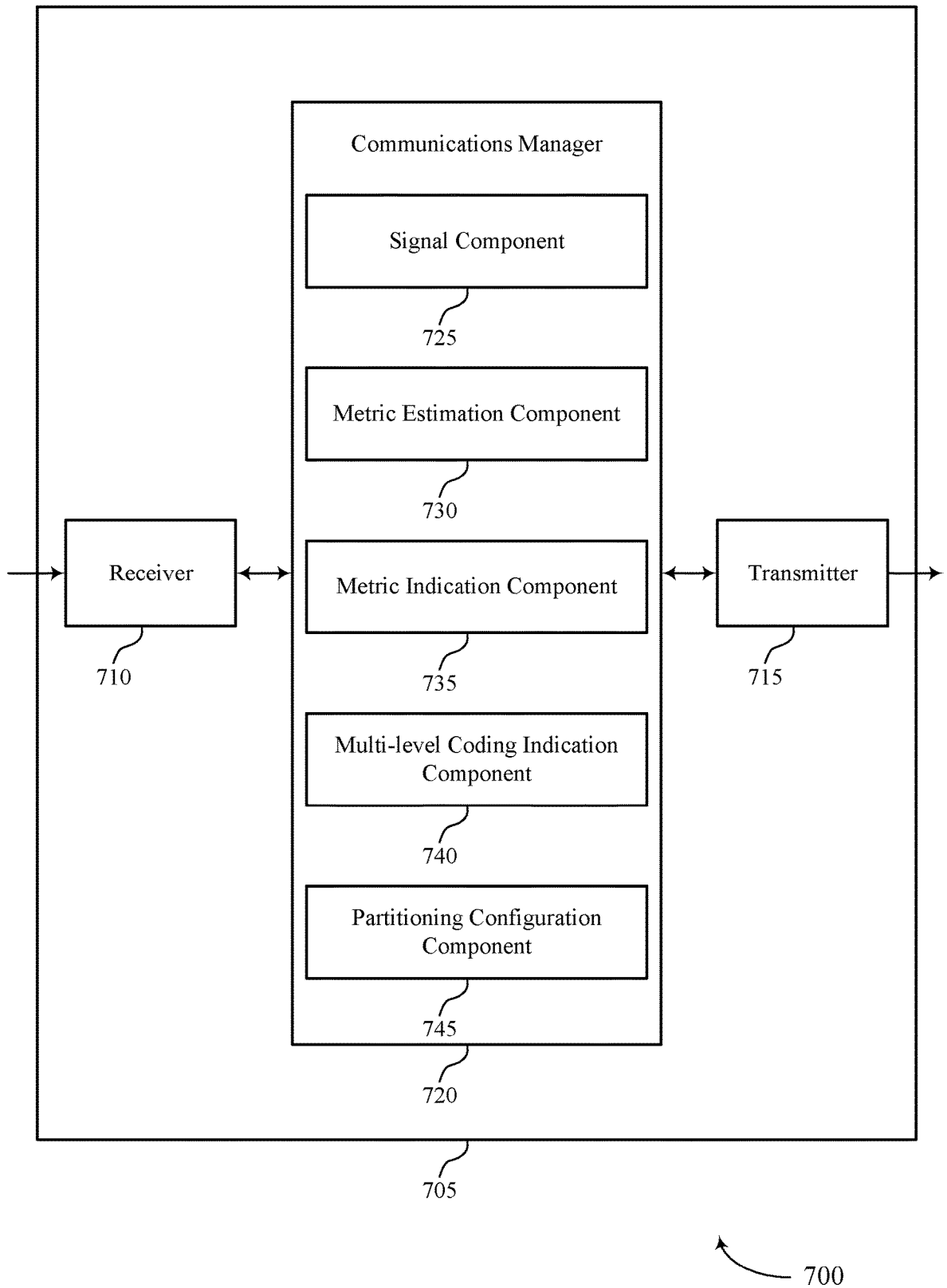

FIG. 7 shows a block diagram 700 of a device 705 that supports channel aware set partitioning for multi-level coding in accordance with aspects of the present disclosure. The device 705 may be an example of aspects of a device 605 or a UE 115 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel aware set partitioning for multi-level coding). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel aware set partitioning for multi-level coding). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel aware set partitioning for multi-level coding as described herein. For example, the communications manager 720 may include a signal component 725, a metric estimation component 730, a metric indication component 735, a multi-level coding indication component 740, a partitioning configuration component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device (e.g., the device 705) in accordance with examples as disclosed herein. The signal component 725 may be configured as or otherwise support a means for receiving one or more signals from a second device (e.g., another device 705). The metric estimation component 730 may be configured as or otherwise support a means for estimating one or more metrics associated with noise of the one or more signals. The metric indication component 735 may be configured as or otherwise support a means for transmitting, to the second device and based on the estimating, a report indicating the one or more metrics. The multi-level coding indication component 740 may be configured as or otherwise support a means for receiving, from the second device, a message indicating a multi-level coding scheme, the multi-level coding scheme based on the one or more metrics and indicating a partitioning configuration of the multi-level coding scheme for communications between the first device and the second device. The partitioning configuration component 745 may be configured as or otherwise support a means for communicating with the second device using the partitioning configuration of the multi-level coding scheme.

Figure 8:
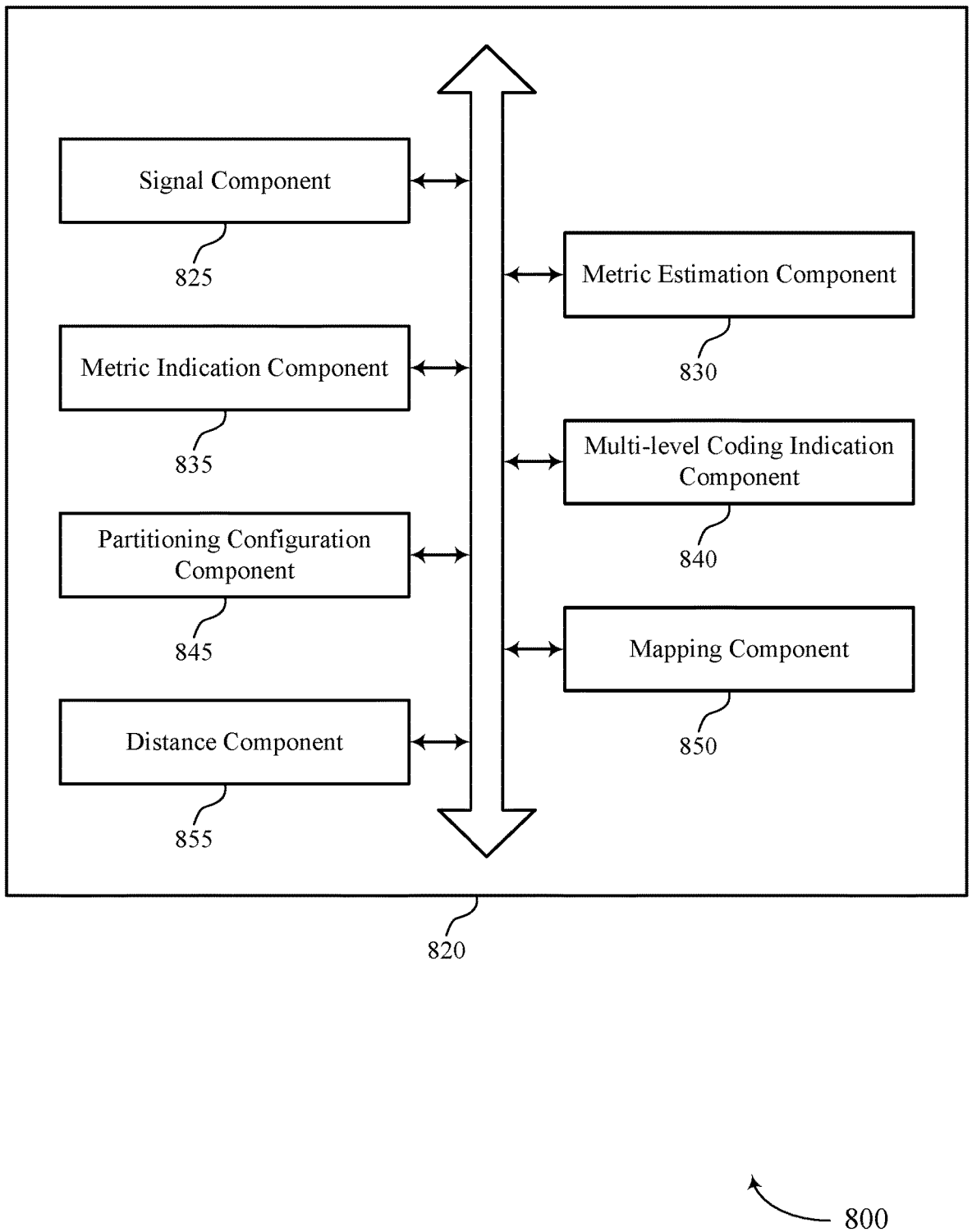
FIG. 8 shows a block diagram of a communications manager that supports channel aware set partitioning for multi-level coding in accordance with aspects of the present disclosure.

FIG. 8 shows a block diagram 800 of a communications manager 820 that supports channel aware set partitioning for multi-level coding in accordance with aspects of the present disclosure. The communications manager 820 may be an example of aspects of a communications manager 620, a communications manager 720, or both, as described herein. The communications manager 820, or various components thereof, may be an example of means for performing various aspects of channel aware set partitioning for multi-level coding as described herein. For example, the communications manager 820 may include a signal component 825, a metric estimation component 830, a metric indication component 835, a multi-level coding indication component 840, a partitioning configuration component 845, a mapping component 850, a distance component 855, or any combination thereof. Each of these components may communicate, directly or indirectly, with one another (e.g., via one or more buses).

The communications manager 820 may support wireless communication at a first device (e.g., a UE 115 or a network entity 105) in accordance with examples as disclosed herein. The signal component 825 may be configured as or otherwise support a means for receiving one or more signals from a second device (e.g., another UE 115 or another network entity 105). The metric estimation component 830 may be configured as or otherwise support a means for estimating one or more metrics associated with noise of the one or more signals. The metric indication component 835 may be configured as or otherwise support a means for transmitting, to the second device and based on the estimating, a report indicating the one or more metrics. The multi-level coding indication component 840 may be configured as or otherwise support a means for receiving, from the second device, a message indicating a multi-level coding scheme, the multi-level coding scheme based on the one or more metrics and indicating a partitioning configuration of the multi-level coding scheme for communications between the first device and the second device. The partitioning configuration component 845 may be configured as or otherwise support a means for communicating with the second device using the partitioning configuration of the multi-level coding scheme.

In some examples, to support communicating with the second device using the partitioning configuration, the mapping component 850 may be configured as or otherwise support a means for mapping, based on the partitioning configuration, a number of bits of a signal onto a subset of constellation symbols of a set of constellation symbols, the subset of constellation symbols including a coset associated with a level of the multi-level coding scheme, each constellation symbol of the subset of constellation symbols separated according to a Euclidean distance and an angular distance, where the Euclidean distance and the angular distance are based on the mapping of the number of bits and the partitioning configuration.

In some examples, the metric estimation component 830 may be configured as or otherwise support a means for estimating a thermal noise metric associated with the Euclidean distance and a phase noise metric associated with the angular distance, where the one or more metrics include the thermal noise metric and the phase noise metric. In some examples, the distance component 855 may be configured as or otherwise support a means for determining the Euclidean distance and the angular distance based on the thermal noise metric, the phase noise metric, or both.

In some examples, the distance component 855 may be configured as or otherwise support a means for determining that the angular distance is a first value based on the phase noise metric exceeding the thermal noise metric and that the Euclidean distance is a second value less than the first value based at least on part on the phase noise metric exceeding the thermal noise metric.

In some examples, the distance component 855 may be configured as or otherwise support a means for determining that the angular distance is a first value based on the phase noise metric exceeding a summation of the thermal noise metric and a noise gap and that the Euclidean distance is a second value less than the first value based at least on part on the phase noise metric exceeding the summation of the thermal noise metric and the noise gap.

In some examples, the distance component 855 may be configured as or otherwise support a means for determining that the angular distance is a first value based on the phase noise metric being below a phase noise threshold and that the Euclidean distance is a second value less than the first value based at least on part on the phase noise metric being below the phase noise threshold.

In some examples, the distance component 855 may be configured as or otherwise support a means for determining that the Euclidean distance is a first value based on the thermal noise metric being below a thermal noise threshold and that the angular distance is a second value less than the first value based at least on part on the thermal noise metric being below the thermal noise threshold.

In some examples, to support communicating with the second device using the partitioning configuration, the partitioning configuration component 845 may be configured as or otherwise support a means for generating at least one signal based on the partitioning configuration of the multi-level coding scheme, the at least one signal including a single carrier signal or a single-carrier orthogonal frequency division multiplexing signal. In some examples, to support communicating with the second device using the partitioning configuration, the signal component 825 may be configured as or otherwise support a means for transmitting the at least one signal to the second device.

In some examples, to support transmitting the report, the metric indication component 835 may be configured as or otherwise support a means for transmitting, to the second device and based on the estimating, a request for the multi-level coding scheme, the request including the report and a partitioning configuration preference, where receiving the message indicating the multi-level coding scheme is based on the request.

In some examples, to support receiving, from the second device, the message indicating the multi-level coding scheme, the multi-level coding indication component 840 may be configured as or otherwise support a means for receiving, from the second device, an index corresponding to one or more parameters of the multi-level coding scheme, where the one or more parameters include the partitioning configuration, a number of bits to map to a first level of the multi-level coding scheme, a number of bits to map to a second level of the multi-level coding scheme, or a combination thereof.

In some examples, to support communicating with the second device using the partitioning configuration of the multi-level coding scheme, the partitioning configuration component 845 may be configured as or otherwise support a means for communicating with the second device using the partitioning configuration, the partitioning configuration identified based on the index and a table associated with the index.

In some examples, the table is preconfigured at the first device, the second device, or both. In some examples, the partitioning configuration includes a group partitioning configuration associated with a group of devices. In some examples, the group of devices includes the first device. In some examples, the one or more metrics includes a phase noise metric associated with a frequency stability of the one or more signals, the frequency stability based on a transmitting component of the second device and a receiving component of the first device.

In some examples, the one or more metrics includes a thermal noise metric, the thermal noise metric including a signal-to-noise ratio. In some examples, the multi-level coding scheme includes a quadrature amplitude modulation multi-level coding scheme or an amplitude phase shift keying multi-level coding scheme.

Figure 9:
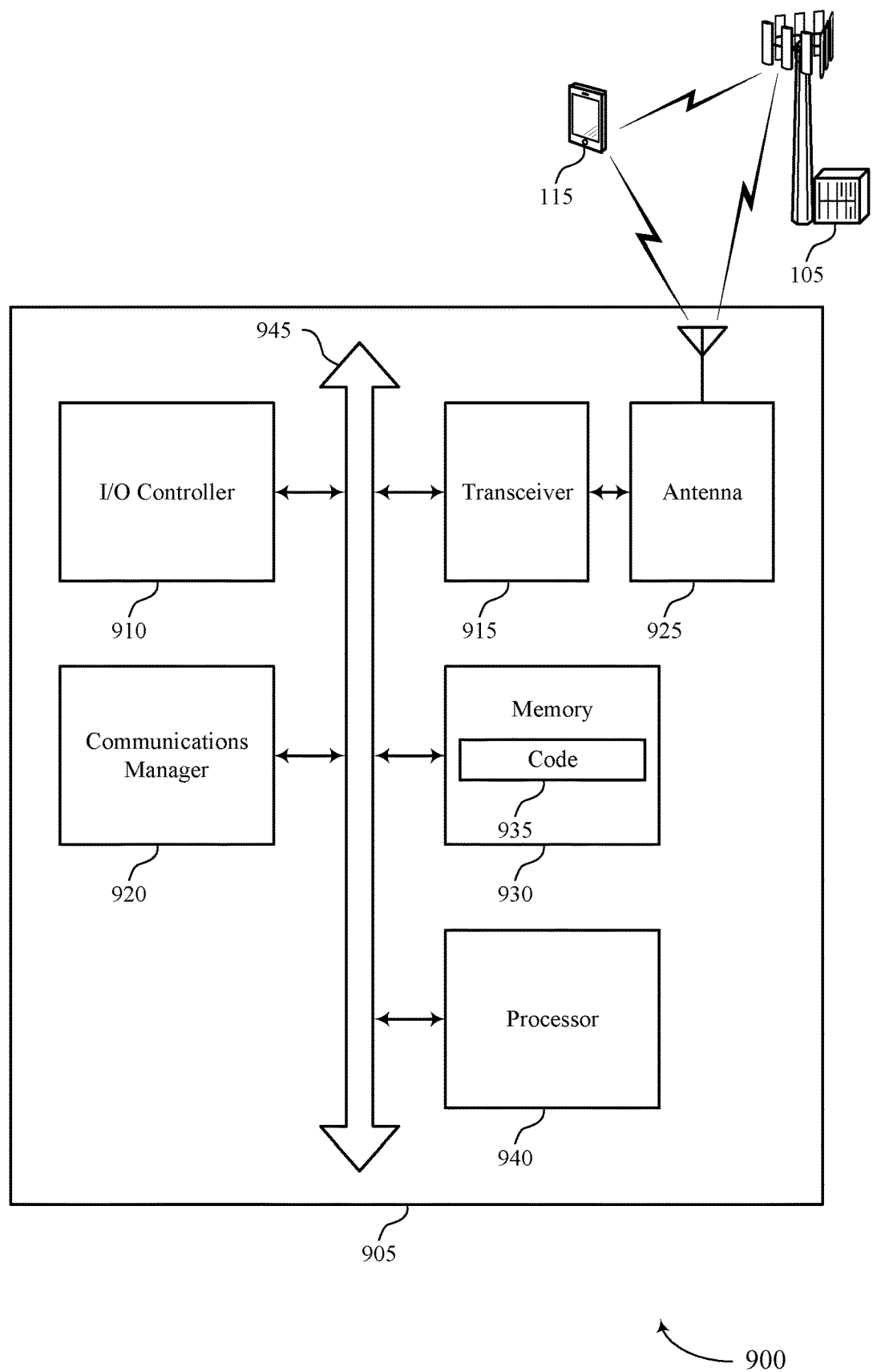
FIG. 9 shows a diagram of a system including a device that supports channel aware set partitioning for multi-level coding in accordance with aspects of the present disclosure.

FIG. 9 shows a diagram of a system 900 including a device 905 that supports channel aware set partitioning for multi-level coding in accordance with aspects of the present disclosure. The device 905 may be an example of or include the components of a device 605, a device 705, a UE 115, or a network entity 105 as described herein. The device 905 may communicate wirelessly with one or more network entities 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel aware set partitioning for multi-level coding). For example, the device 905 or a component of the device 905 may include a processor 940 and memory 930 coupled with or to the processor 940, the processor 940 and memory 930 configured to perform various functions described herein.

The communications manager 920 may support wireless communication at a first device (e.g., a device 905) in accordance with examples as disclosed herein. For example, the communications manager 920 may be configured as or otherwise support a means for receiving one or more signals from a second device (e.g., another device 905). The communications manager 920 may be configured as or otherwise support a means for estimating one or more metrics associated with noise of the one or more signals. The communications manager 920 may be configured as or otherwise support a means for transmitting, to the second device and based on the estimating, a report indicating the one or more metrics. The communications manager 920 may be configured as or otherwise support a means for receiving, from the second device, a message indicating a multi-level coding scheme, the multi-level coding scheme based on the one or more metrics and indicating a partitioning configuration of the multi-level coding scheme for communications between the first device and the second device. The communications manager 920 may be configured as or otherwise support a means for communicating with the second device using the partitioning configuration of the multi-level coding scheme.

By including or configuring the communications manager 920 in accordance with examples as described herein, the device 905 may support techniques for improvements to reliability of communications from channel aware set partitioning, improved spectral efficiency, and increased data rates, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel aware set partitioning for multi-level coding as described herein, or the processor 940 and the memory 930 may be otherwise configured to perform or support such operations.

Figure 10:
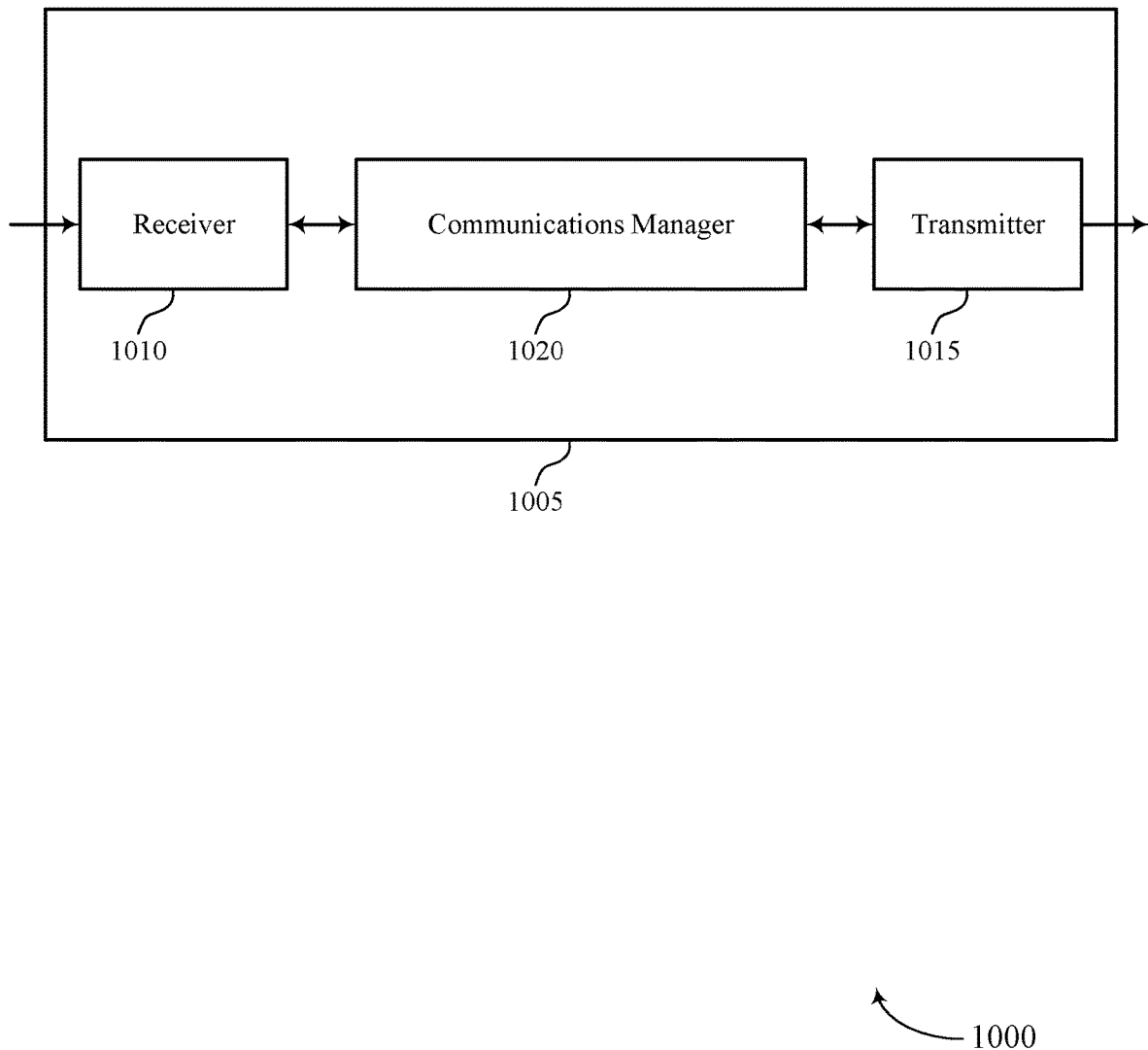
FIGS. 10 and 11 show block diagrams of devices that support channel aware set partitioning for multi-level coding in accordance with aspects of the present disclosure.

FIG. 10 shows a block diagram 1000 of a device 1005 that supports channel aware set partitioning for multi-level coding in accordance with aspects of the present disclosure. The device 1005 may be an example of aspects of a network entity 105 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel aware set partitioning for multi-level coding). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel aware set partitioning for multi-level coding). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of channel aware set partitioning for multi-level coding as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second device (e.g., a device 1005) in accordance with examples as disclosed herein. For example, the communications manager 1020 may be configured as or otherwise support a means for transmitting one or more signals to at least a first device (e.g., another device 1005). The communications manager 1020 may be configured as or otherwise support a means for receiving, from the first device and based on the one or more signals, a report indicating one or more metrics associated with noise of the one or more signals received at the first device. The communications manager 1020 may be configured as or otherwise support a means for transmitting, to the first device, a message indicating a multi-level coding scheme based on the one or more metrics, the multi-level coding scheme indicating a partitioning configuration for the multi-level coding scheme for communications between the first device and the second device.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption, more efficient utilization of communication resources, improved spectral efficiency, and improved utilization of processing capability, among other benefits.

Figure 11:
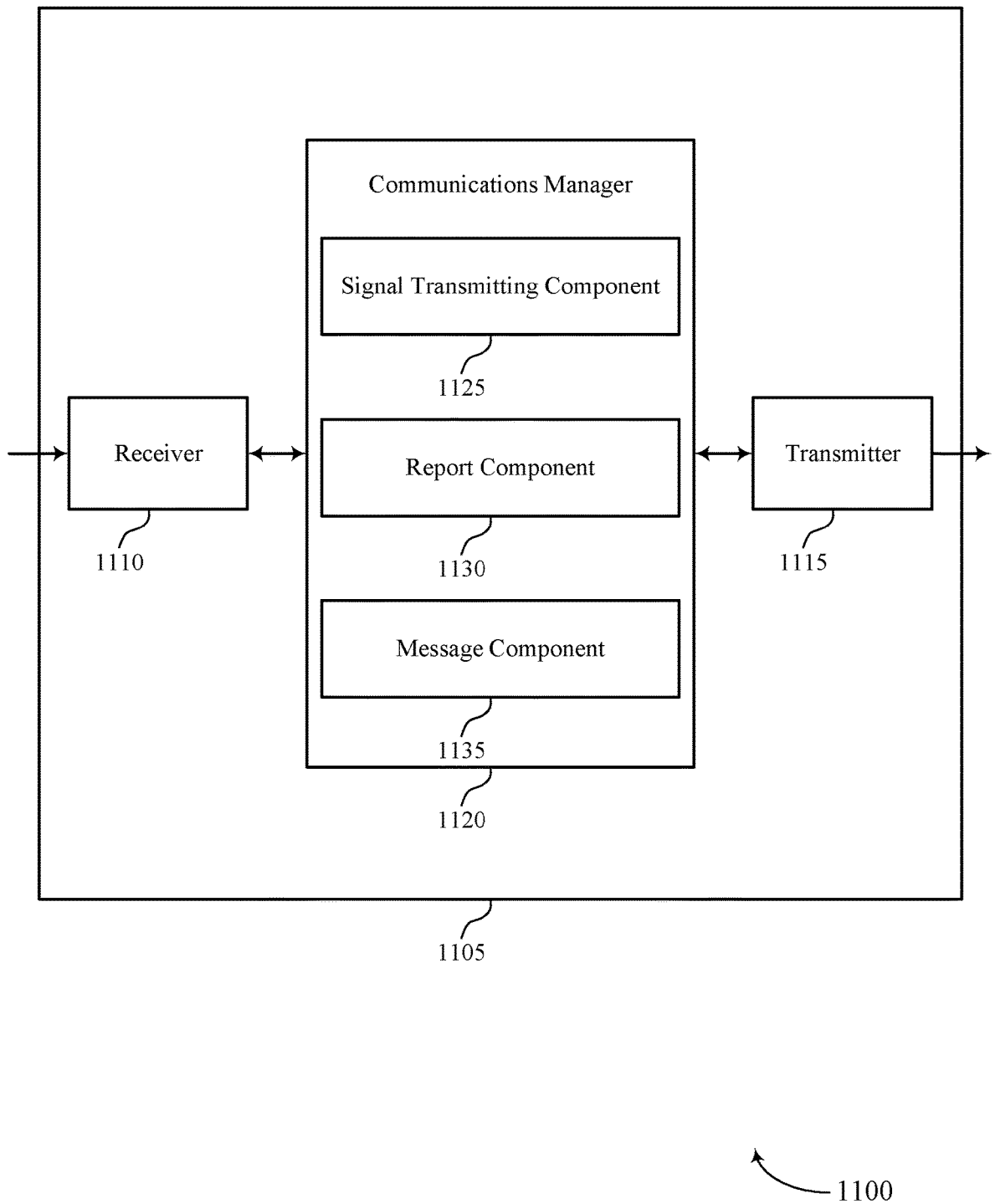

FIG. 11 shows a block diagram 1100 of a device 1105 that supports channel aware set partitioning for multi-level coding in accordance with aspects of the present disclosure. The device 1105 may be an example of aspects of a device 1005, a network entity 105, or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel aware set partitioning for multi-level coding). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel aware set partitioning for multi-level coding). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of channel aware set partitioning for multi-level coding as described herein. For example, the communications manager 1120 may include a signal transmitting component 1125, a report component 1130, a message component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a second device (e.g., a device 1105) in accordance with examples as disclosed herein. The signal transmitting component 1125 may be configured as or otherwise support a means for transmitting one or more signals to at least a first device (e.g., another device 1105). The report component 1130 may be configured as or otherwise support a means for receiving, from the first device and based on the one or more signals, a report indicating one or more metrics associated with noise of the one or more signals received at the first device. The message component 1135 may be configured as or otherwise support a means for transmitting, to the first device, a message indicating a multi-level coding scheme based on the one or more metrics, the multi-level coding scheme indicating a partitioning configuration for the multi-level coding scheme for communications between the first device and the second device.

Figure 12:
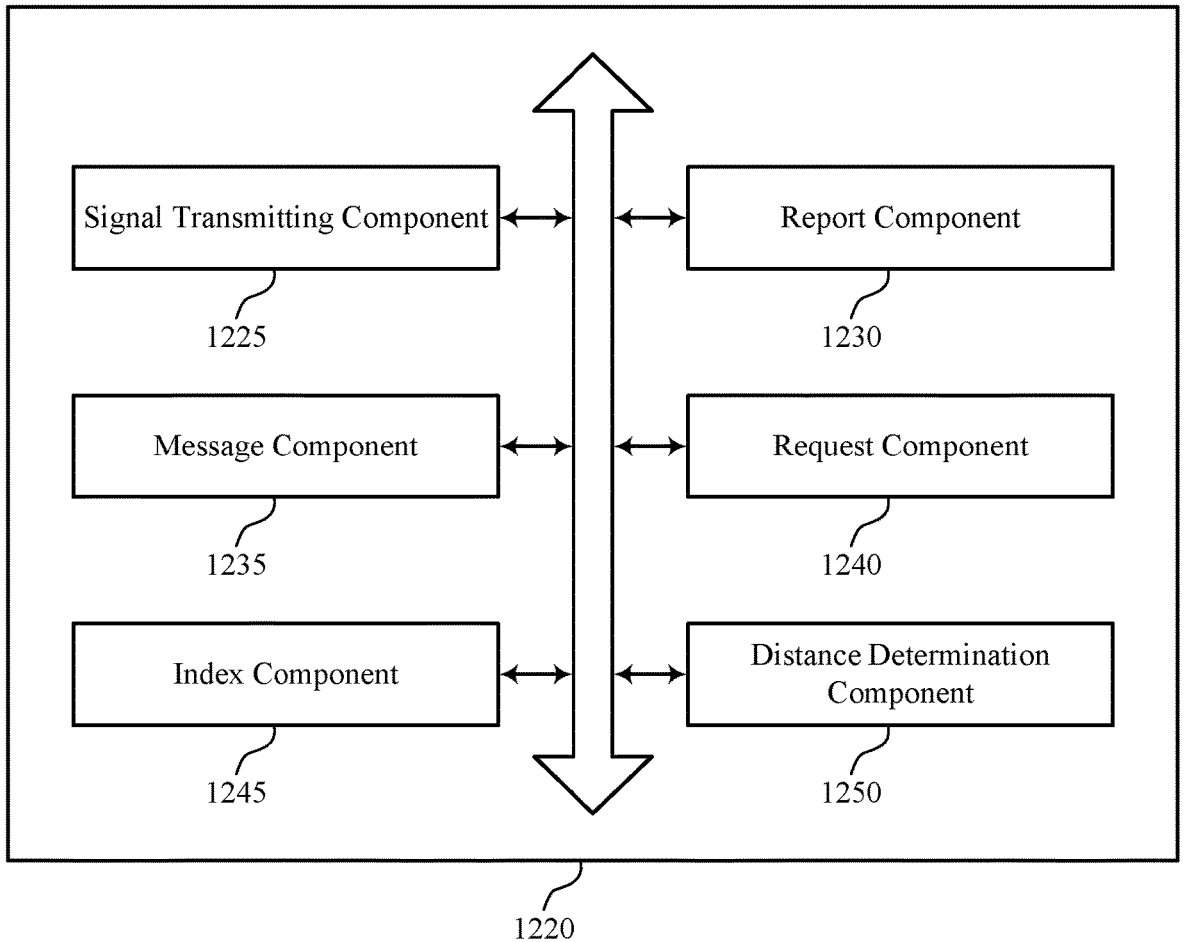
FIG. 12 shows a block diagram of a communications manager that supports channel aware set partitioning for multi-level coding in accordance with aspects of the present disclosure.

FIG. 12 shows a block diagram 1200 of a communications manager 1220 that supports channel aware set partitioning for multi-level coding in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of channel aware set partitioning for multi-level coding as described herein. For example, the communications manager 1220 may include a signal transmitting component 1225, a report component 1230, a message component 1235, a request component 1240, an index component 1245, a distance determination component 1250, or any combination thereof. Each of these components may communicate, directly or indirectly, with one another (e.g., via one or more buses).

The communications manager 1220 may support wireless communication at a second device (e.g., a network entity 105 or a UE 115) in accordance with examples as disclosed herein. The signal transmitting component 1225 may be configured as or otherwise support a means for transmitting one or more signals to at least a first device (e.g., another network entity 105 or another UE 115). The report component 1230 may be configured as or otherwise support a means for receiving, from the first device and based on the one or more signals, a report indicating one or more metrics associated with noise of the one or more signals received at the first device. The message component 1235 may be configured as or otherwise support a means for transmitting, to the first device, a message indicating a multi-level coding scheme based on the one or more metrics, the multi-level coding scheme indicating a partitioning configuration for the multi-level coding scheme for communications between the first device and the second device.

In some examples, the multi-level coding scheme indicates a mapping of a number of bits of a signal onto a subset of constellation symbols of a set of constellation symbols and a Euclidean distance and an angular distance for separating each constellation symbol of the subset of constellation symbols, the subset of constellation symbols including a coset associated with a level of the multi-level coding scheme and the Euclidean distance and the angular distance based on the mapping of the number of bits and the partitioning configuration.

In some examples, the distance determination component 1250 may be configured as or otherwise support a means for determining that the angular distance is a first value based on a phase noise metric exceeding a thermal noise metric and that the Euclidean distance is a second value less than the first value based at least on part on the phase noise metric exceeding the thermal noise metric, the one or more metrics including the phase noise metric and the thermal noise metric.

In some examples, the distance determination component 1250 may be configured as or otherwise support a means for determining that the angular distance is a first value based on a phase noise metric exceeding a summation of a thermal noise metric and a noise gap and that the Euclidean distance is a second value less than the first value based at least on part on the phase noise metric exceeding the summation of the thermal noise metric and the noise gap, the one or more metrics including the phase noise metric and the thermal noise metric.

In some examples, the distance determination component 1250 may be configured as or otherwise support a means for determining that the angular distance is a first value based on a phase noise metric being below a phase noise threshold and that the Euclidean distance is a second value less than the first value based at least on part on the phase noise metric being below the phase noise threshold, the one or more metrics including the phase noise metric.

In some examples, the distance determination component 1250 may be configured as or otherwise support a means for determining that the Euclidean distance is a first value based on a thermal noise metric being below a thermal noise threshold and that the angular distance is a second value less than the first value based at least on part on the thermal noise metric being below the thermal noise threshold, the one or more metrics including the thermal noise metric.

In some examples, to support receiving the report indicating the one or more metrics, the request component 1240 may be configured as or otherwise support a means for receiving, from the first device and based on the one or more signals, a request for the multi-level coding scheme, the request including the report and a partitioning configuration preference, where transmitting the message indicating the multi-level coding scheme is based on the request.

In some examples, to support transmitting, to the first device, the message indicating the multi-level coding scheme, the index component 1245 may be configured as or otherwise support a means for transmitting, to the first device, an index corresponding to one or more parameters of the multi-level coding scheme, where the one or more parameters include the partitioning configuration, a number of bits to map to a first level of the multi-level coding scheme, a number of bits to map to a second level of the multi-level coding scheme, or a combination thereof.

In some examples, the signal transmitting component 1225 may be configured as or otherwise support a means for transmitting one or more signals to a third device. In some examples, the report component 1230 may be configured as or otherwise support a means for receiving, from the third device and based on the one or more signals transmitted to the third device, a second report indicating one or more metrics associated with noise of the one or more signals transmitted to the third device, where transmitting, to the first device, the message indicating the multi-level coding scheme is based on the report from the first device and the second report from the third device.

In some examples, the partitioning configuration includes a group partitioning configuration associated with a group of devices. In some examples, the group of devices includes the first device and the third device. In some examples, the one or more metrics includes a phase noise metric associated with a frequency stability of the one or more signals, the frequency stability based on a transmitting component of the second device and a receiving component of the first device.

In some examples, the one or more metrics includes a thermal noise metric, the thermal noise metric including a signal-to-noise ratio. In some examples, the multi-level coding scheme includes a quadrature amplitude modulation multi-level coding scheme or an amplitude phase shift keying multi-level coding scheme.

Figure 13:
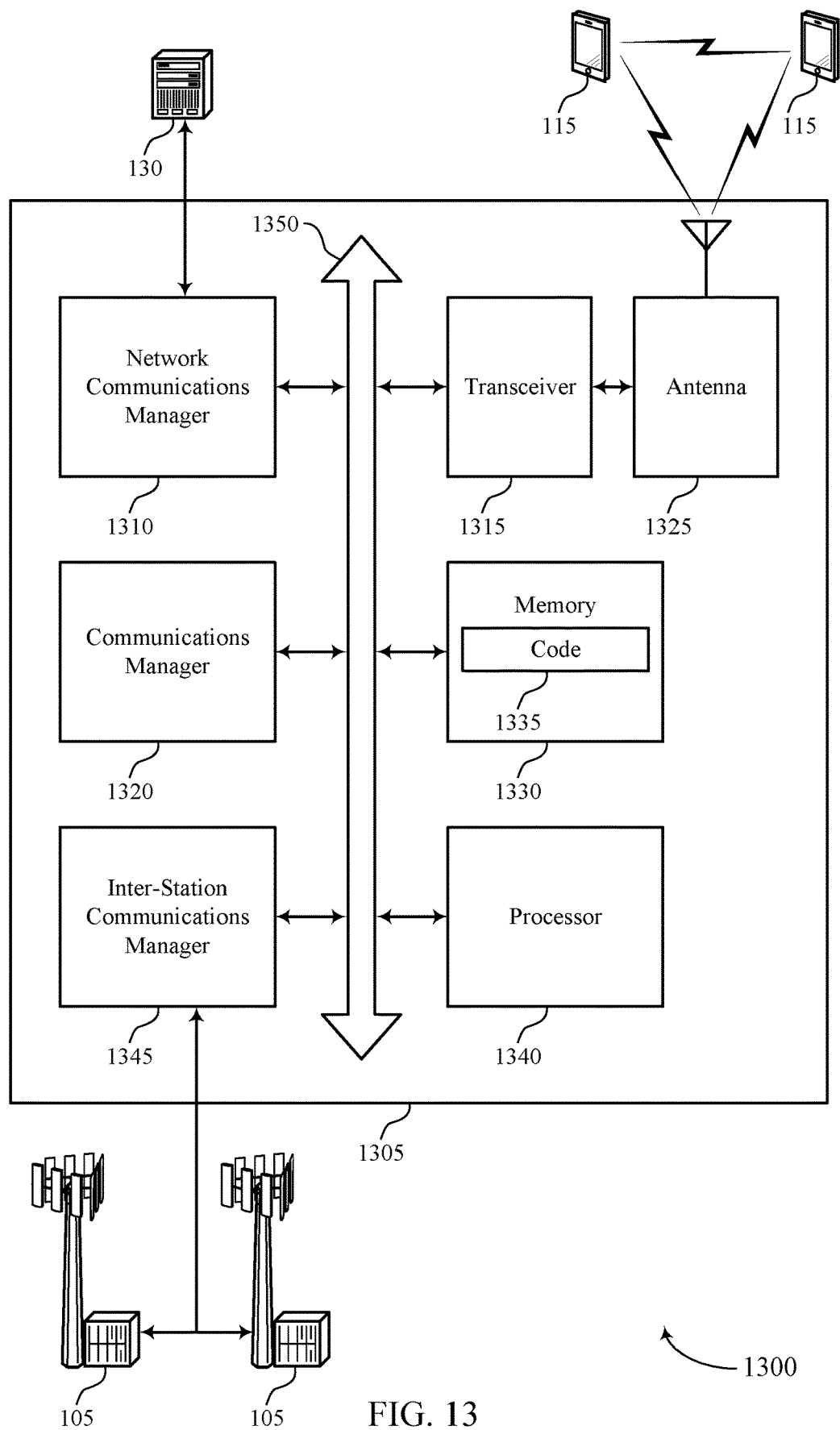
FIG. 13 shows a diagram of a system including a device that supports channel aware set partitioning for multi-level coding in accordance with aspects of the present disclosure.

FIG. 13 shows a diagram of a system 1300 including a device 1305 that supports channel aware set partitioning for multi-level coding in accordance with aspects of the present disclosure. The device 1305 may be an example of or include the components of a device 1005, a device 1105, a network entity 105, or a UE 115 as described herein. The device 1305 may communicate wirelessly with one or more network entities 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting channel aware set partitioning for multi-level coding). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other network entities 105, and may include a controller or scheduler for controlling communications with UEs 115 in cooperation with other network entities 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between network entities 105.

The communications manager 1320 may support wireless communication at a second device (e.g., a device 1305) in accordance with examples as disclosed herein. For example, the communications manager 1320 may be configured as or otherwise support a means for transmitting one or more signals to at least a first device (e.g., another device 1305). The communications manager 1320 may be configured as or otherwise support a means for receiving, from the first device and based on the one or more signals, a report indicating one or more metrics associated with noise of the one or more signals received at the first device. The communications manager 1320 may be configured as or otherwise support a means for transmitting, to the first device, a message indicating a multi-level coding scheme based on the one or more metrics, the multi-level coding scheme indicating a partitioning configuration for the multi-level coding scheme for communications between the first device and the second device.

By including or configuring the communications manager 1320 in accordance with examples as described herein, the device 1305 may support techniques for improvements to reliability of communications from channel aware set partitioning, improved spectral efficiency, and increased data rates, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of channel aware set partitioning for multi-level coding as described herein, or the processor 1340 and the memory 1330 may be otherwise configured to perform or support such operations.

Figure 14:
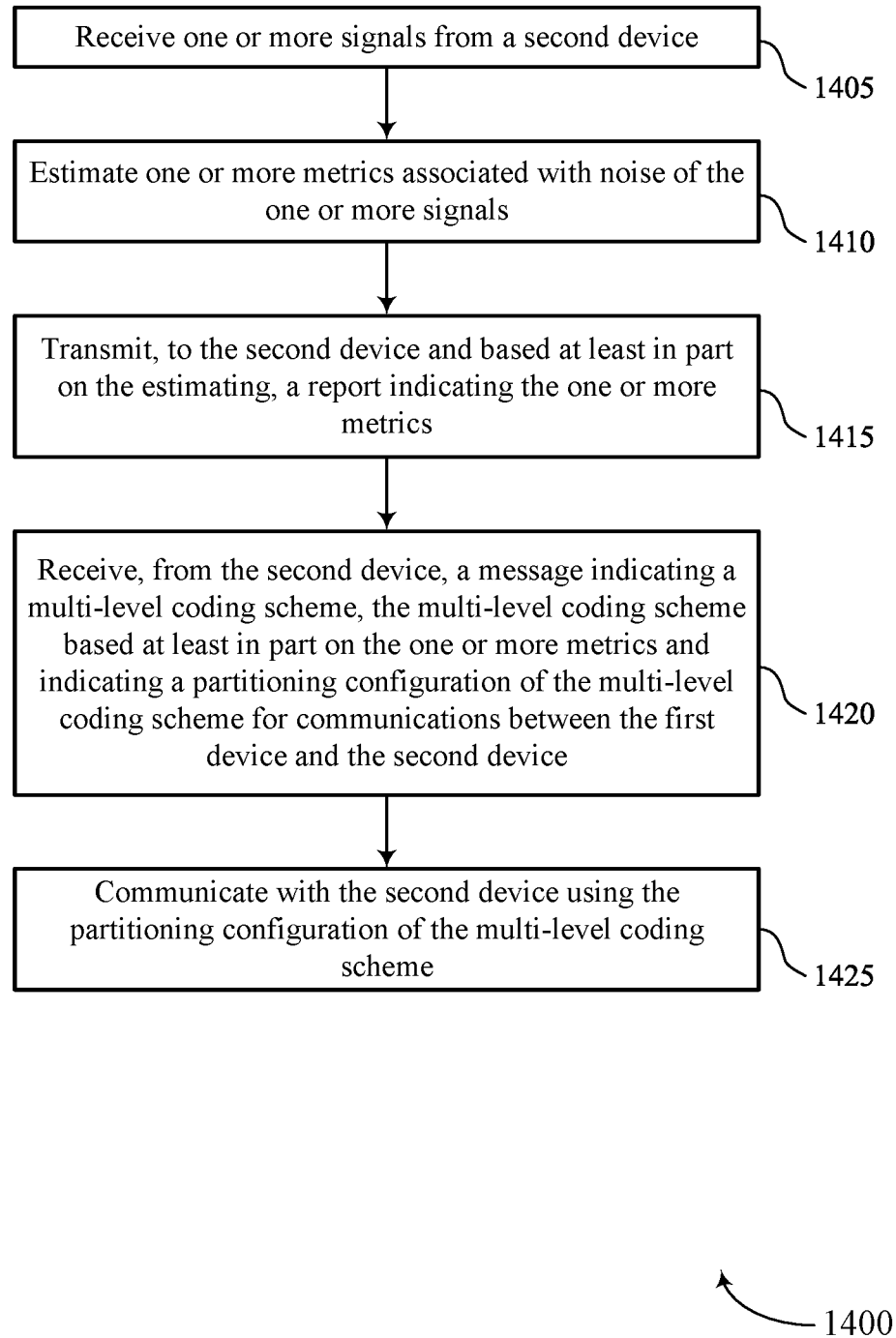
FIGS. 14 through 17 show flowcharts illustrating methods that support channel aware set partitioning for multi-level coding in accordance with aspects of the present disclosure.

FIG. 14 shows a flowchart illustrating a method 1400 that supports channel aware set partitioning for multi-level coding in accordance with aspects of the present disclosure. The operations of the method 1400 may be implemented by a UE or a network entity or components of the UE or the network entity as described herein. For example, the operations of the method 1400 may be performed by a UE 115 or a network entity 105 as described with reference to FIGS. 1 through 9. In some examples, a UE or a network entity may execute a set of instructions to control the functional elements of the UE or the network entity to perform the described functions. Additionally or alternatively, the UE or the network entity may perform aspects of the described functions using special-purpose hardware.

At 1405, the method may include receiving one or more signals from a second device (e.g., a UE or a network entity). The operations of 1405 may be performed in accordance with examples as disclosed herein. In some examples, aspects of the operations of 1405 may be performed by a signal component 825 as described with reference to FIG. 8.

At 1410, the method may include estimating one or more metrics associated with noise of the one or more signals. The operations of 1410 may be performed in accordance with examples as disclosed herein. In some examples, aspects of the operations of 1410 may be performed by a metric estimation component 830 as described with reference to FIG. 8.

At 1415, the method may include transmitting, to the second device and based on the estimating, a report indicating the one or more metrics. The operations of 1415 may be performed in accordance with examples as disclosed herein. In some examples, aspects of the operations of 1415 may be performed by a metric indication component 835 as described with reference to FIG. 8.

At 1420, the method may include receiving, from the second device, a message indicating a multi-level coding scheme, the multi-level coding scheme based on the one or more metrics and indicating a partitioning configuration of the multi-level coding scheme for communications between the first device and the second device. The operations of 1420 may be performed in accordance with examples as disclosed herein. In some examples, aspects of the operations of 1420 may be performed by a multi-level coding indication component 840 as described with reference to FIG. 8.

At 1425, the method may include communicating with the second device using the partitioning configuration of the multi-level coding scheme. The operations of 1425 may be performed in accordance with examples as disclosed herein. In some examples, aspects of the operations of 1425 may be performed by a partitioning configuration component 845 as described with reference to FIG. 8.

Figure 15:
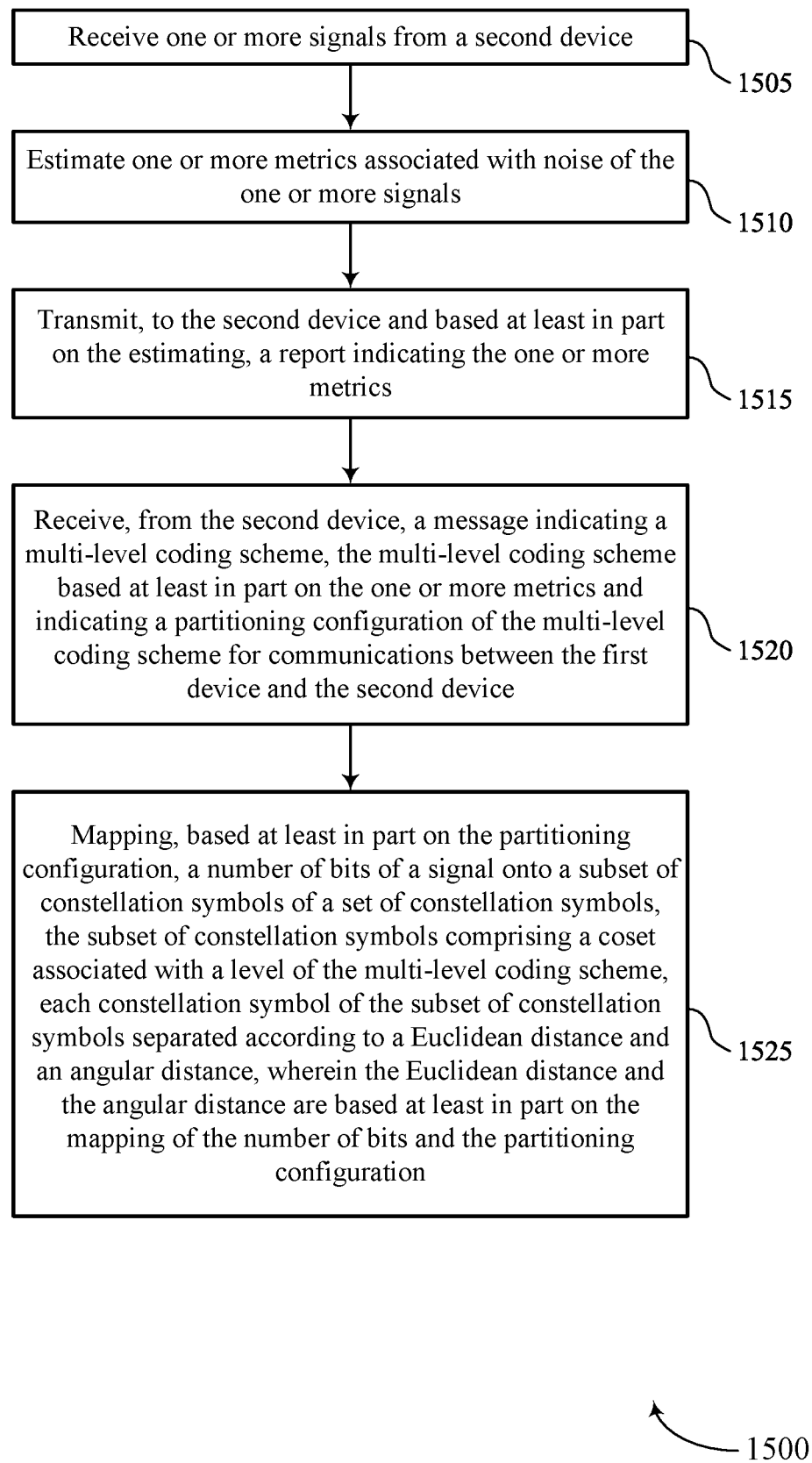

FIG. 15 shows a flowchart illustrating a method 1500 that supports channel aware set partitioning for multi-level coding in accordance with aspects of the present disclosure. The operations of the method 1500 may be implemented by a UE or a network entity or components of the UE or the network entity as described herein. For example, the operations of the method 1500 may be performed by a UE 115 or a network entity 105 as described with reference to FIGS. 1 through 9. In some examples, a UE or a network entity may execute a set of instructions to control the functional elements of the UE or the network entity to perform the described functions. Additionally or alternatively, the UE or the network entity may perform aspects of the described functions using special-purpose hardware.

At 1505, the method may include receiving one or more signals from a second device (e.g., a UE or a network entity). The operations of 1505 may be performed in accordance with examples as disclosed herein. In some examples, aspects of the operations of 1505 may be performed by a signal component 825 as described with reference to FIG. 8.

At 1510, the method may include estimating one or more metrics associated with noise of the one or more signals. The operations of 1510 may be performed in accordance with examples as disclosed herein. In some examples, aspects of the operations of 1510 may be performed by a metric estimation component 830 as described with reference to FIG. 8.

At 1515, the method may include transmitting, to the second device and based on the estimating, a report indicating the one or more metrics. The operations of 1515 may be performed in accordance with examples as disclosed herein. In some examples, aspects of the operations of 1515 may be performed by a metric indication component 835 as described with reference to FIG. 8.

At 1520, the method may include receiving, from the second device, a message indicating a multi-level coding scheme, the multi-level coding scheme based on the one or more metrics and indicating a partitioning configuration of the multi-level coding scheme for communications between the first device and the second device. The operations of 1520 may be performed in accordance with examples as disclosed herein. In some examples, aspects of the operations of 1520 may be performed by a multi-level coding indication component 840 as described with reference to FIG. 8.

At 1525, the method may include mapping, based on the partitioning configuration, a number of bits of a signal onto a subset of constellation symbols of a set of constellation symbols, the subset of constellation symbols including a coset associated with a level of the multi-level coding scheme, each constellation symbol of the subset of constellation symbols separated according to a Euclidean distance and an angular distance, where the Euclidean distance and the angular distance are based on the mapping of the number of bits and the partitioning configuration. The operations of 1525 may be performed in accordance with examples as disclosed herein. In some examples, aspects of the operations of 1525 may be performed by a mapping component 850 as described with reference to FIG. 8.

Figure 16:
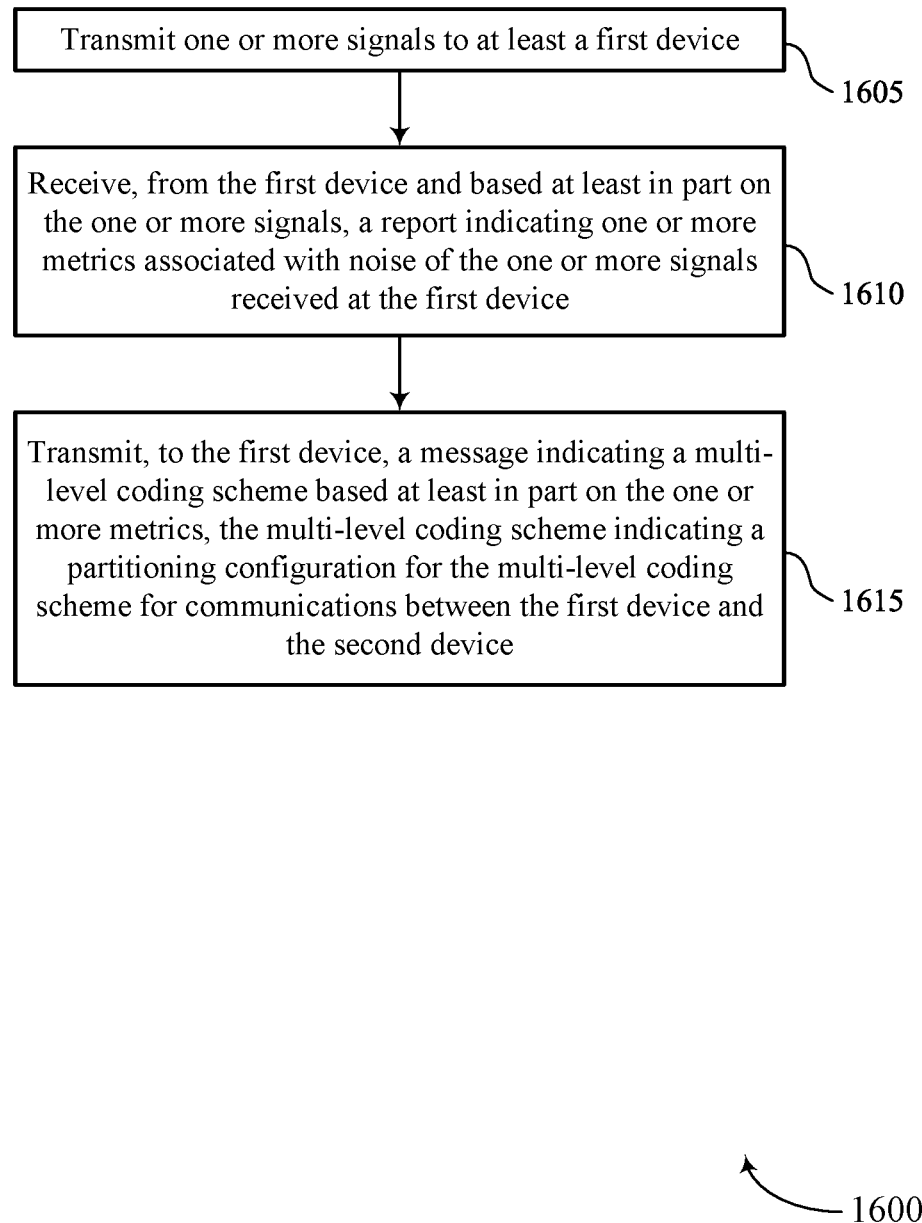

FIG. 16 shows a flowchart illustrating a method 1600 that supports channel aware set partitioning for multi-level coding in accordance with aspects of the present disclosure. The operations of the method 1600 may be implemented by a network entity or a UE or components of the network entity or the UE as described herein. For example, the operations of the method 1600 may be performed by a network entity 105 or a UE 115 as described with reference to FIGS. 1 through 5 and 10 through 13. In some examples, a network entity or a UE may execute a set of instructions to control the functional elements of the network entity or the UE to perform the described functions. Additionally or alternatively, the network entity or the UE may perform aspects of the described functions using special-purpose hardware.

At 1605, the method may include transmitting one or more signals to at least a first device. The operations of 1605 may be performed in accordance with examples as disclosed herein. In some examples, aspects of the operations of 1605 may be performed by a signal transmitting component 1225 as described with reference to FIG. 12.

At 1610, the method may include receiving, from the first device and based on the one or more signals, a report indicating one or more metrics associated with noise of the one or more signals received at the first device. The operations of 1610 may be performed in accordance with examples as disclosed herein. In some examples, aspects of the operations of 1610 may be performed by a report component 1230 as described with reference to FIG. 12.

At 1615, the method may include transmitting, to the first device, a message indicating a multi-level coding scheme based on the one or more metrics, the multi-level coding scheme indicating a partitioning configuration for the multi-level coding scheme for communications between the first device and the second device. The operations of 1615 may be performed in accordance with examples as disclosed herein. In some examples, aspects of the operations of 1615 may be performed by a message component 1235 as described with reference to FIG. 12.

Figure 17:
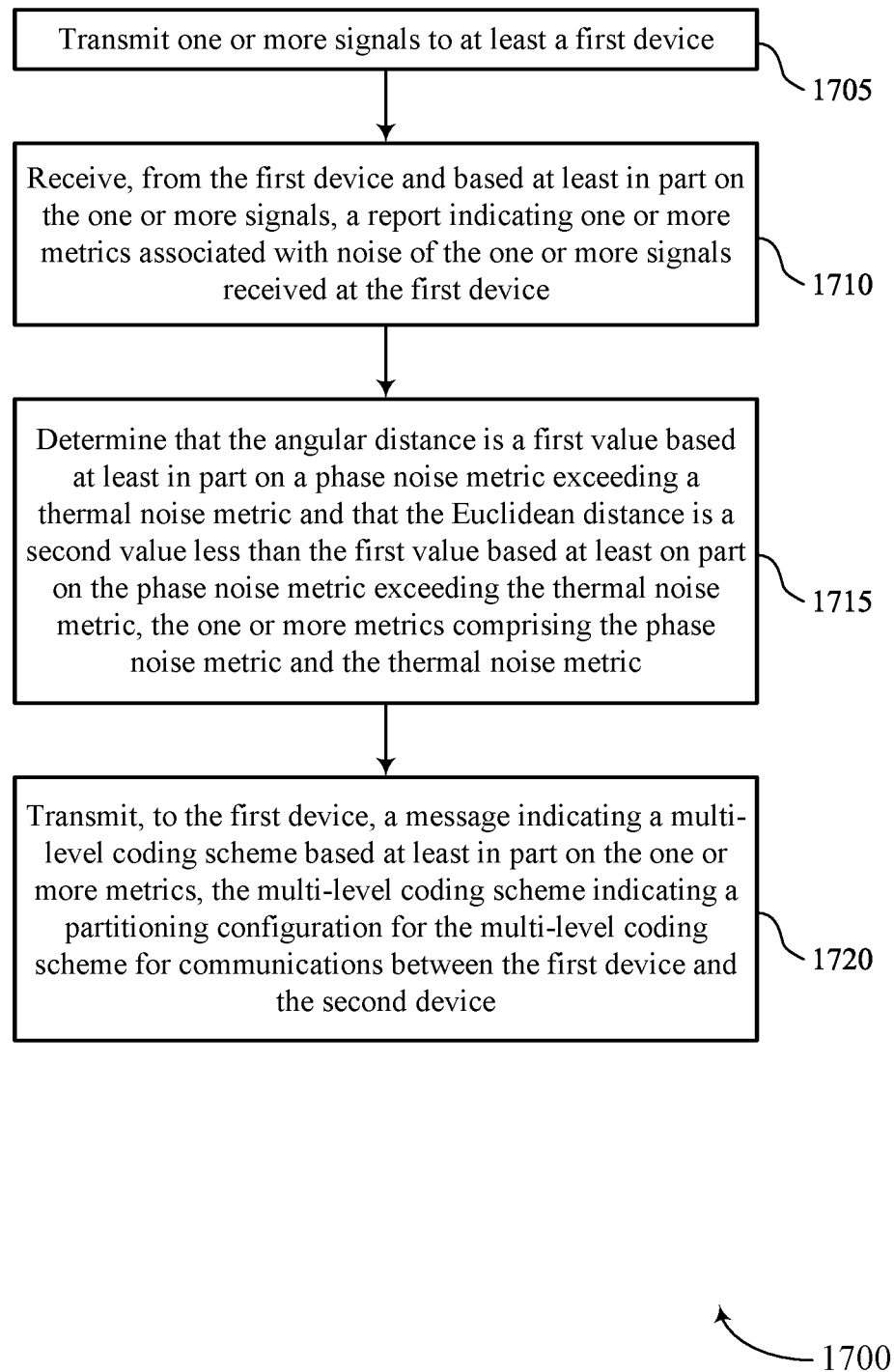

FIG. 17 shows a flowchart illustrating a method 1700 that supports channel aware set partitioning for multi-level coding in accordance with aspects of the present disclosure. The operations of the method 1700 may be implemented by a network entity or a UE or components of the network entity or the UE as described herein. For example, the operations of the method 1700 may be performed by a network entity 105 or a UE 115 as described with reference to FIGS. 1 through 5 and 10 through 13. In some examples, a network entity or a UE may execute a set of instructions to control the functional elements of the network entity or the UE to perform the described functions. Additionally or alternatively, the network entity or the UE may perform aspects of the described functions using special-purpose hardware.

At 1705, the method may include transmitting one or more signals to at least a first device. The operations of 1705 may be performed in accordance with examples as disclosed herein. In some examples, aspects of the operations of 1705 may be performed by a signal transmitting component 1225 as described with reference to FIG. 12.

At 1710, the method may include receiving, from the first device and based on the one or more signals, a report indicating one or more metrics associated with noise of the one or more signals received at the first device. The operations of 1710 may be performed in accordance with examples as disclosed herein. In some examples, aspects of the operations of 1710 may be performed by a report component 1230 as described with reference to FIG. 12.

At 1715, the method may include determining that the angular distance is a first value based on a phase noise metric exceeding a thermal noise metric and that the Euclidean distance is a second value less than the first value based at least on part on the phase noise metric exceeding the thermal noise metric, the one or more metrics including the phase noise metric and the thermal noise metric. The operations of 1715 may be performed in accordance with examples as disclosed herein. In some examples, aspects of the operations of 1715 may be performed by a distance determination component 1250 as described with reference to FIG. 12.

At 1720, the method may include transmitting, to the first device, a message indicating a multi-level coding scheme based on the one or more metrics, the multi-level coding scheme indicating a partitioning configuration for the multi-level coding scheme for communications between the first device and the second device. The operations of 1720 may be performed in accordance with examples as disclosed herein. In some examples, aspects of the operations of 1720 may be performed by a message component 1235 as described with reference to FIG. 12.

The following provides an overview of aspects of the present disclosure:

Aspect 1: A method for wireless communication at a first device, comprising: receiving one or more signals from a second device; estimating one or more metrics associated with noise of the one or more signals; transmitting, to the second device and based at least in part on the estimating, a report indicating the one or more metrics; receiving, from the second device, a message indicating a multi-level coding scheme, the multi-level coding scheme based at least in part on the one or more metrics and indicating a partitioning configuration of the multi-level coding scheme for communications between the first device and the second device; and communicating with the second device using the partitioning configuration of the multi-level coding scheme.

Aspect 2: The method of aspect 1, wherein communicating with the second device using the partitioning configuration comprises: mapping, based at least in part on the partitioning configuration, a number of bits of a signal onto a subset of constellation symbols of a set of constellation symbols, the subset of constellation symbols comprising a coset associated with a level of the multi-level coding scheme, each constellation symbol of the subset of constellation symbols separated according to a Euclidean distance and an angular distance, wherein the Euclidean distance and the angular distance are based at least in part on the mapping of the number of bits and the partitioning configuration.

Aspect 3: The method of aspect 2, further comprising: estimating a thermal noise metric associated with the Euclidean distance and a phase noise metric associated with the angular distance, wherein the one or more metrics comprise the thermal noise metric and the phase noise metric; and determining the Euclidean distance and the angular distance based at least in part on the thermal noise metric, the phase noise metric, or both.

Aspect 4: The method of aspect 3, further comprising: determining that the angular distance is a first value based at least in part on the phase noise metric exceeding the thermal noise metric and that the Euclidean distance is a second value less than the first value based at least on part on the phase noise metric exceeding the thermal noise metric.

Aspect 5: The method of aspect 3, further comprising: determining that the angular distance is a first value based at least in part on the phase noise metric exceeding a summation of the thermal noise metric and a noise gap and that the Euclidean distance is a second value less than the first value based at least on part on the phase noise metric exceeding the summation of the thermal noise metric and the noise gap.

Aspect 6: The method of aspect 3, further comprising: determining that the angular distance is a first value based at least in part on the phase noise metric being below a phase noise threshold and that the Euclidean distance is a second value less than the first value based at least on part on the phase noise metric being below the phase noise threshold.

Aspect 7: The method of aspect 3, further comprising: determining that the Euclidean distance is a first value based at least in part on the thermal noise metric being below a thermal noise threshold and that the angular distance is a second value less than the first value based at least on part on the thermal noise metric being below the thermal noise threshold.

Aspect 8: The method of any of aspects 1 through 7, wherein communicating with the second device using the partitioning configuration comprises: generating at least one signal based at least in part on the partitioning configuration of the multi-level coding scheme, the at least one signal comprising a single carrier signal or a single-carrier orthogonal frequency division multiplexing signal; and transmitting the at least one signal to the second device.

Aspect 9: The method of any of aspects 1 through 8, wherein transmitting the report comprises: transmitting, to the second device and based at least in part on the estimating, a request for the multi-level coding scheme, the request comprising the report and a partitioning configuration preference, wherein receiving the message indicating the multi-level coding scheme is based at least in part on the request.

Aspect 10: The method of any of aspects 1 through 9, wherein receiving, from the second device, the message indicating the multi-level coding scheme comprises: receiving, from the second device, an index corresponding to one or more parameters of the multi-level coding scheme, wherein the one or more parameters comprise the partitioning configuration, a number of bits to map to a first level of the multi-level coding scheme, a number of bits to map to a second level of the multi-level coding scheme, or a combination thereof.

Aspect 11: The method of aspect 10, wherein communicating with the second device using the partitioning configuration of the multi-level coding scheme comprises: communicating with the second device using the partitioning configuration, the partitioning configuration identified based at least in part on the index and a table associated with the index.

Aspect 12: The method of aspect 11, wherein the table is preconfigured at the first device, the second device, or both.

Aspect 13: The method of any of aspects 1 through 12, wherein the partitioning configuration comprises a group partitioning configuration associated with a group of devices, the group of devices comprises the first device.

Aspect 14: The method of any of aspects 1 through 13, wherein the one or more metrics comprises a phase noise metric associated with a frequency stability of the one or more signals, the frequency stability based at least in part on a transmitting component of the second device and a receiving component of the first device.

Aspect 15: The method of any of aspects 1 through 3 and 6 through 14, wherein the one or more metrics comprises a thermal noise metric, the thermal noise metric comprising an SNR.

Aspect 16: The method of any of aspects 1 through 15, wherein the multi-level coding scheme comprises a QAM multi-level coding scheme or an APSK multi-level coding scheme.

Aspect 17: A method for wireless communication at a second device, comprising: transmitting one or more signals to at least a first device; receiving, from the first device and based at least in part on the one or more signals, a report indicating one or more metrics associated with noise of the one or more signals received at the first device; and transmitting, to the first device, a message indicating a multi-level coding scheme based at least in part on the one or more metrics, the multi-level coding scheme indicating a partitioning configuration for the multi-level coding scheme for communications between the first device and the second device.

Aspect 18: The method of aspect 17, wherein the multi-level coding scheme indicates a mapping of a number of bits of a signal onto a subset of constellation symbols of a set of constellation symbols and a Euclidean distance and an angular distance for separating each constellation symbol of the subset of constellation symbols, the subset of constellation symbols comprising a coset associated with a level of the multi-level coding scheme and the Euclidean distance and the angular distance based at least in part on the mapping of the number of bits and the partitioning configuration.

Aspect 19: The method of aspect 18, further comprising: determining that the angular distance is a first value based at least in part on a phase noise metric exceeding a thermal noise metric and that the Euclidean distance is a second value less than the first value based at least on part on the phase noise metric exceeding the thermal noise metric, the one or more metrics comprising the phase noise metric and the thermal noise metric.

Aspect 20: The method of aspect 18, further comprising: determining that the angular distance is a first value based at least in part on a phase noise metric exceeding a summation of a thermal noise metric and a noise gap and that the Euclidean distance is a second value less than the first value based at least on part on the phase noise metric exceeding the summation of the thermal noise metric and the noise gap, the one or more metrics comprising the phase noise metric and the thermal noise metric.

Aspect 21: The method of aspect 18, further comprising: determining that the angular distance is a first value based at least in part on a phase noise metric being below a phase noise threshold and that the Euclidean distance is a second value less than the first value based at least on part on the phase noise metric being below the phase noise threshold, the one or more metrics comprising the phase noise metric.

Aspect 22: The method of aspect 18, further comprising: determining that the Euclidean distance is a first value based at least in part on a thermal noise metric being below a thermal noise threshold and that the angular distance is a second value less than the first value based at least on part on the thermal noise metric being below the thermal noise threshold, the one or more metrics comprising the thermal noise metric.

Aspect 23: The method of any of aspects 17 through 22, wherein receiving the report indicating the one or more metrics comprises: receiving, from the first device and based at least in part on the one or more signals, a request for the multi-level coding scheme, the request comprising the report and a partitioning configuration preference, wherein transmitting the message indicating the multi-level coding scheme is based at least in part on the request.

Aspect 24: The method of any of aspects 17 through 23, wherein transmitting, to the first device, the message indicating the multi-level coding scheme comprises: transmitting, to the first device, an index corresponding to one or more parameters of the multi-level coding scheme, wherein the one or more parameters comprise the partitioning configuration, a number of bits to map to a first level of the multi-level coding scheme, a number of bits to map to a second level of the multi-level coding scheme, or a combination thereof.

Aspect 25: The method of any of aspects 17 through 24, further comprising: transmitting one or more signals to a third device; and receiving, from the third device and based at least in part on the one or more signals transmitted to the third device, a second report indicating one or more metrics associated with noise of the one or more signals transmitted to the third device, wherein transmitting, to the first device, the message indicating the multi-level coding scheme is based at least in part on the report from the first device and the second report from the third device.

Aspect 26: The method of aspect 25, wherein the partitioning configuration comprises a group partitioning configuration associated with a group of devices, the group of devices comprises the first device and the third device.

Aspect 27: The method of any of aspects 17 through 26, wherein the one or more metrics comprises a phase noise metric associated with a frequency stability of the one or more signals, the frequency stability based at least in part on a transmitting component of the second device and a receiving component of the first device.

Aspect 28: The method of any of aspects 17, 18, and 21 through 27, wherein the one or more metrics comprises a thermal noise metric, the thermal noise metric comprising an SNR.

Aspect 29: The method of any of aspects 17 through 28, wherein the multi-level coding scheme comprises a QAM multi-level coding scheme or an APSK multi-level coding scheme.

Aspect 30: An apparatus for wireless communication at a first device, comprising a processor; memory coupled with the processor; and one or more instructions stored in the memory and executable by the processor to cause the apparatus to, based at least in part on the one or more instructions, perform a method of any of aspects 1 through 16.

Aspect 31: An apparatus for wireless communication at a first device, comprising at least one means for performing a method of any of aspects 1 through 16.

Aspect 32: A non-transitory computer-readable medium storing code for wireless communication at a first device, the code comprising instructions executable by a processor to perform a method of any of aspects 1 through 16.

Aspect 33: An apparatus for wireless communication at a second device, comprising a processor; memory coupled with the processor; and one or more instructions stored in the memory and executable by the processor to cause the apparatus to, based at least in part on the one or more instructions, perform a method of any of aspects 17 through 29.

Aspect 34: An apparatus for wireless communication at a second device, comprising at least one means for performing a method of any of aspects 17 through 29.

Aspect 35: A non-transitory computer-readable medium storing code for wireless communication at a second device, the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
    a processor;
    memory coupled with the processor; and
    one or more instructions stored in the memory and executable by the processor to cause the apparatus to, based at least in part on the one or more instructions:
        receive one or more signals from a second device;
        estimate one or more metrics associated with noise of the one or more signals;
        transmit, to the second device and based at least in part on the estimating, a report indicating the one or more metrics;
        receive, from the second device, a message indicating a multi-level coding scheme, the multi-level coding scheme based at least in part on the one or more metrics and indicating a partitioning configuration of the multi-level coding scheme for communications between the first device and the second device; and
        communicate with the second device using the partitioning configuration of the multi-level coding scheme.

2. The apparatus of claim 1, wherein the one or more instructions to communicate with the second device using the partitioning configuration are executable by the processor to cause the apparatus to, based at least in part on the one or more instructions:
    mapping, based at least in part on the partitioning configuration, a number of bits of a signal onto a subset of constellation symbols of a set of constellation symbols, the subset of constellation symbols comprising a coset associated with a level of the multi-level coding scheme, each constellation symbol of the subset of constellation symbols separated according to a Euclidean distance and an angular distance, wherein the Euclidean distance and the angular distance are based at least in part on the mapping of the number of bits and the partitioning configuration.

3. The apparatus of claim 2, wherein the one or more instructions are further executable by the processor to cause the apparatus to, based at least in part on the one or more instructions:
    estimate a thermal noise metric associated with the Euclidean distance and a phase noise metric associated with the angular distance, wherein the one or more metrics comprise the thermal noise metric and the phase noise metric; and
    determine the Euclidean distance and the angular distance based at least in part on the thermal noise metric, the phase noise metric, or both.

4. The apparatus of claim 3, wherein the one or more instructions are further executable by the processor to cause the apparatus to, based at least in part on the one or more instructions:
    determine that the angular distance is a first value based at least in part on the phase noise metric exceeding the thermal noise metric and that the Euclidean distance is a second value less than the first value based at least on part on the phase noise metric exceeding the thermal noise metric.

5. The apparatus of claim 3, wherein the one or more instructions are further executable by the processor to cause the apparatus to, based at least in part on the one or more instructions:
    determine that the angular distance is a first value based at least in part on the phase noise metric exceeding a summation of the thermal noise metric and a noise gap and that the Euclidean distance is a second value less than the first value based at least on part on the phase noise metric exceeding the summation of the thermal noise metric and the noise gap.

6. The apparatus of claim 3, wherein the one or more instructions are further executable by the processor to cause the apparatus to, based at least in part on the one or more instructions:
    determine that the angular distance is a first value based at least in part on the phase noise metric being below a phase noise threshold and that the Euclidean distance is a second value less than the first value based at least on part on the phase noise metric being below the phase noise threshold.

7. The apparatus of claim 3, wherein the one or more instructions are further executable by the processor to cause the apparatus to, based at least in part on the one or more instructions:

determine that the Euclidean distance is a first value based at least in part on the thermal noise metric being below a thermal noise threshold and that the angular distance is a second value less than the first value based at least on part on the thermal noise metric being below the thermal noise threshold.

8. The apparatus of claim 1, wherein the one or more instructions to communicate with the second device using the partitioning configuration are executable by the processor to cause the apparatus to, based at least in part on the one or more instructions:

generate at least one signal based at least in part on the partitioning configuration of the multi-level coding scheme, the at least one signal comprising a single carrier signal or a single-carrier orthogonal frequency division multiplexing signal; and transmit the at least one signal to the second device.

9. The apparatus of claim 1, wherein the one or more instructions to transmit the report are executable by the processor to cause the apparatus to, based at least in part on the one or more instructions:

transmit, to the second device and based at least in part on the estimating, a request for the multi-level coding scheme, the request comprising the report and a partitioning configuration preference, wherein receiving the message indicating the multi-level coding scheme is based at least in part on the request.

10. The apparatus of claim 1, wherein the one or more instructions to receive, from the second device, the message indicating the multi-level coding scheme are executable by the processor to cause the apparatus to, based at least in part on the one or more instructions:

receive, from the second device, an index corresponding to one or more parameters of the multi-level coding scheme, wherein the one or more parameters comprise the partitioning configuration, a number of bits to map to a first level of the multi-level coding scheme, a number of bits to map to a second level of the multi-level coding scheme, or a combination thereof.

11. The apparatus of claim 10, wherein the one or more instructions to communicate with the second device using the partitioning configuration of the multi-level coding scheme are executable by the processor to cause the apparatus to, based at least in part on the one or more instructions:

communicate with the second device using the partitioning configuration, the partitioning configuration identified based at least in part on the index and a table associated with the index.

12. The apparatus of claim 11, wherein the table is preconfigured at the first device, the second device, or both.

13. The apparatus of claim 1, wherein:
the partitioning configuration comprises a group partitioning configuration associated with a group of devices, the group of devices comprising the first device.

14. The apparatus of claim 1, wherein the one or more metrics comprises a phase noise metric associated with a frequency stability of the one or more signals, the frequency stability based at least in part on a transmitting component of the second device and a receiving component of the first device.

15. The apparatus of claim 1, wherein the one or more metrics comprises a thermal noise metric, the thermal noise metric comprising a signal-to-noise ratio.

16. The apparatus of claim 1, wherein the multi-level coding scheme comprises a quadrature amplitude modulation multi-level coding scheme or an amplitude phase shift keying multi-level coding scheme.

17. An apparatus for wireless communication at a second device, comprising:
a processor;
memory coupled with the processor; and
one or more instructions stored in the memory and executable by the processor to cause the apparatus to, based at least in part on the one or more instructions:
transmit one or more signals to at least a first device;
receive, from the first device and based at least in part on the one or more signals, a report indicating one or more metrics associated with noise of the one or more signals received at the first device; and
transmit, to the first device, a message indicating a multi-level coding scheme based at least in part on the one or more metrics, the multi-level coding scheme indicating a partitioning configuration for the multi-level coding scheme for communications between the first device and the second device.

18. The apparatus of claim 17, wherein the multi-level coding scheme indicates a mapping of a number of bits of a signal onto a subset of constellation symbols of a set of constellation symbols and a Euclidean distance and an angular distance for separating each constellation symbol of the subset of constellation symbols, the subset of constellation symbols comprising a coset associated with a level of the multi-level coding scheme and the Euclidean distance and the angular distance based at least in part on the mapping of the number of bits and the partitioning configuration.

19. The apparatus of claim 18, wherein the one or more instructions are further executable by the processor to cause the apparatus to, based at least in part on the one or more instructions:

determine that the angular distance is a first value based at least in part on a phase noise metric exceeding a thermal noise metric and that the Euclidean distance is a second value less than the first value based at least on part on the phase noise metric exceeding the thermal noise metric, the one or more metrics comprising the phase noise metric and the thermal noise metric.

20. The apparatus of claim 18, wherein the one or more instructions are further executable by the processor to cause the apparatus to, based at least in part on the one or more instructions:

determine that the angular distance is a first value based at least in part on a phase noise metric exceeding a summation of a thermal noise metric and a noise gap and that the Euclidean distance is a second value less than the first value based at least on part on the phase noise metric exceeding the summation of the thermal noise metric and the noise gap, the one or more metrics comprising the phase noise metric and the thermal noise metric.

21. The apparatus of claim 18, wherein the one or more instructions are further executable by the processor to cause the apparatus to, based at least in part on the one or more instructions:

determine that the angular distance is a first value based at least in part on a phase noise metric being below a phase noise threshold and that the Euclidean distance is a second value less than the first value based at least on part on the phase noise metric being below the phase noise threshold, the one or more metrics comprising the phase noise metric.

22. The apparatus of claim 18, wherein the one or more instructions are further executable by the processor to cause the apparatus to, based at least in part on the one or more instructions:
determine that the Euclidean distance is a first value based at least in part on a thermal noise metric being below a thermal noise threshold and that the angular distance is a second value less than the first value based at least on part on the thermal noise metric being below the thermal noise threshold, the one or more metrics comprising the thermal noise metric.

23. The apparatus of claim 17, wherein the one or more instructions to receive the report indicating the one or more metrics are executable by the processor to cause the apparatus to, based at least in part on the one or more instructions:
receive, from the first device and based at least in part on the one or more signals, a request for the multi-level coding scheme, the request comprising the report and a partitioning configuration preference, wherein transmitting the message indicating the multi-level coding scheme is based at least in part on the request.

24. The apparatus of claim 17, wherein the one or more instructions to transmit, to the first device, the message indicating the multi-level coding scheme are executable by the processor to cause the apparatus to, based at least in part on the one or more instructions:
transmit, to the first device, an index corresponding to one or more parameters of the multi-level coding scheme, wherein the one or more parameters comprise the partitioning configuration, a number of bits to map to a first level of the multi-level coding scheme, a number of bits to map to a second level of the multi-level coding scheme, or a combination thereof.

25. The apparatus of claim 17, wherein the one or more instructions are further executable by the processor to cause the apparatus to, based at least in part on the one or more instructions:
transmit one or more signals to a third device; and
receive, from the third device and based at least in part on the one or more signals transmitted to the third device, a second report indicating one or more metrics associated with noise of the one or more signals transmitted to the third device, wherein transmitting, to the first device, the message indicating the multi-level coding scheme is based at least in part on the report from the first device and the second report from the third device.

26. The apparatus of claim 25, wherein:
the partitioning configuration comprises a group partitioning configuration associated with a group of devices, the group of devices comprising the first device and the third device.

27. The apparatus of claim 17, wherein the one or more metrics comprises a phase noise metric associated with a frequency stability of the one or more signals, the frequency stability based at least in part on a transmitting component of the second device and a receiving component of the first device.

28. The apparatus of claim 17, wherein the multi-level coding scheme comprises a quadrature amplitude modulation multi-level coding scheme or an amplitude phase shift keying multi-level coding scheme.

29. A method for wireless communication at a first device, comprising:
receiving one or more signals from a second device;
estimating one or more metrics associated with noise of the one or more signals;
transmitting, to the second device and based at least in part on the estimating, a report indicating the one or more metrics;
receiving, from the second device, a message indicating a multi-level coding scheme, the multi-level coding scheme based at least in part on the one or more metrics and indicating a partitioning configuration of the multi-level coding scheme for communications between the first device and the second device; and
communicating with the second device using the partitioning configuration of the multi-level coding scheme.

30. A method for wireless communication at a second device, comprising:
transmitting one or more signals to at least a first device;
receiving, from the first device and based at least in part on the one or more signals, a report indicating one or more metrics associated with noise of the one or more signals received at the first device; and
transmitting, to the first device, a message indicating a multi-level coding scheme based at least in part on the one or more metrics, the multi-level coding scheme indicating a partitioning configuration for the multi-level coding scheme for communications between the first device and the second device.

\* \* \* \* \*